(12) United States Patent
Bhatia et al.

(10) Patent No.: US 11,444,852 B2
(45) Date of Patent: *Sep. 13, 2022

(54) MICROSERVICE GENERATION SYSTEM

(71) Applicant: SAP SE, Walldorf (DE)

(72) Inventors: Anubhav Bhatia, Sunnyvale, CA (US); Patrick Brose, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,262

(22) Filed: Jun. 1, 2021

(65) Prior Publication Data

US 2021/0288891 A1 Sep. 16, 2021

Related U.S. Application Data

(63) Continuation of application No. 16/443,740, filed on Jun. 17, 2019, now Pat. No. 11,057,282.

(51) Int. Cl.
*G06F 15/16* (2006.01)
*H04L 41/5041* (2022.01)
*H04L 9/40* (2022.01)

(52) U.S. Cl.
CPC ...... *H04L 41/5048* (2013.01); *H04L 41/5045* (2013.01); *H04L 63/08* (2013.01); *H04L 63/101* (2013.01)

(58) Field of Classification Search
CPC ............. H04L 41/5045; H04L 41/5048; H04L 41/5058; H04L 63/08; H04L 63/101
See application file for complete search history.

(56) References Cited

U.S. PATENT DOCUMENTS

| 11,057,282 | B2 | 7/2021 | Bhatia et al. |
| 11,128,633 | B2 | 9/2021 | Bhatia et al. |
| 2010/0114618 | A1* | 5/2010 | Wilcock ........... G06Q 10/06375 705/7.37 |

(Continued)

OTHER PUBLICATIONS

"U.S. Appl. No. 16/443,716, Non Final Office Action dated Feb. 11, 2021", 20 pgs.

(Continued)

*Primary Examiner* — Normin Abedin
(74) *Attorney, Agent, or Firm* — Schwegman Lundberg & Woessner, P.A.

(57) ABSTRACT

Systems and methods are provided for receiving, from a computing device, a selection of a template for a custom microservice and configuration parameters for the custom microservice, generating the template for the custom microservice using the configuration parameters, the template for the custom microservice comprising defined interfaces for accessing core microservices, defined integration points for integration with a system providing the core microservices, and stubs for custom components for the custom microservice, and providing the template for the custom microservice to the computing device, wherein custom components for the custom microservice are added to the template via the computing device using the stubs for the custom components. The systems and methods further provide for registering the custom microservice to be exposed to and accessed by a tenant with authorization to access the custom microservice along with the core microservices.

20 Claims, 19 Drawing Sheets

(56) References Cited

U.S. PATENT DOCUMENTS

2016/0124742 A1\* 5/2016 Rangasamy ........ H04L 41/0803
                                                    717/103
2018/0373574 A1  12/2018 Hargrove et al.
2019/0102162 A1   4/2019 Pitre et al.
2020/0396140 A1  12/2020 Bhatia et al.
2020/0396225 A1  12/2020 Bhatia et al.

OTHER PUBLICATIONS

"U.S. Appl. No. 16/443,716, Response filed May 10, 2021 to Non Final Office Action dated Feb. 11, 2021", 13 pgs.
"U.S. Appl. No. 16/443,740, Non Final Office Action dated Nov. 27, 2020", 10 pgs.
"U.S. Appl. No. 16/443,740, Notice of Allowance dated Mar. 3, 2021", 8 pgs.
"U.S. Appl. No. 16/443,740, Response filed Feb. 16, 2021 to Non Final Office Action dated Nov. 27, 2020", 10 pgs.
Chauvel, Franck, et al., "Using Intrusive Microservices to Enable Deep Customization of Multi-Tenant Saas", 11th International Conference on the Quality of Information and Communications Technology, (2018), 30-37.
"U.S. Appl. No. 16/443,716, Notice of Allowance dated Jun. 4, 2021", 16 pgs.

\* cited by examiner

MICROSERVICE GENERATION SYSTEM

CROSS-REFERENCE TO RELATED APPLICATIONS

This application is a continuation of prior application Ser. No. 16/443,740, filed on Jun. 17, 2019, which is incorporated by reference herein in its entirety.

BACKGROUND

Standard services can be provided by a cloud services system, for example, to be used by consumers of such services. For instance, a predictive maintenance and service system may provide standard services for managing assets (e.g., oil and gas utilities, manufacturing, machines or technology) and determining maintenance or other issues corresponding to the assets. Consumers of the services, however, may have need for services that are not provided by the standard services. Conventional systems do not provide a mechanism for custom development of services by a consumer that can be used within the cloud service system and interact with the standard services.

BRIEF DESCRIPTION OF THE DRAWINGS

Various ones of the appended drawings merely illustrate example embodiments of the present disclosure and should not be considered as limiting its scope.

FIGS. 4-9 illustrate example user interfaces, according to some example embodiments.

FIGS. 13-17 illustrate example user interfaces, according to some example embodiments

DETAILED DESCRIPTION

Systems and methods described herein relate to generating and consuming a custom microservice. As explained above, products and systems, such as a predictive maintenance and service product or system, may provide standard services, such as microservices, for managing assets (e.g., oil and gas utilities, manufacturing, machines or technology) and determining maintenance or other issues corresponding to the assets. Consumers of the services, however, may have need for services that are not provided by the standard services. For example, consumers may wish to use data delivered by the predictive maintenance and service system as well as consumer-owned data sources. For instance, a consumer may wish to develop their own analysis tool application that includes features relevant to consumer-owned industrial business processes, which they want to use in conjunction with standard microservices offered by the predictive maintenance and service system. Example embodiments allow the consumer (e.g., reliability engineers, planners) to develop and use custom microservices together with standard microservices. Example embodiments provide a development framework to facilitate such custom microservice development which includes an integrated development environment, templates for structuring custom microservices, deployment and debugging features, lifecycle management, and the like, as described in further detail herein.

Example embodiments provide for the newly created custom microservice to be registered with the predictive maintenance and service system to show up with the standard microservices and integrate with existing microservices and applications seamlessly. The custom microservice can interact with existing standard microservices and react to broadcasting of semantic rules and objects by the standard microservices or other applications in the system. The custom microservice is symmetric in terms of navigations and segmentation of data. The custom microservice can be proprietary and private to the consumer or can be offered to other consumers.

Accordingly, example embodiments provide for a multi-tenant custom microservice generation framework that allows a consumer to subscribe to a custom microservice toolkit service and use templates to generate code of a custom microservice, adhering to interfaces delivered by the predictive maintenance and service system for data consumption and sharing, subscribe to an event bus, and react to semantic rules and data object propagation. Example embodiments allow consumers to generate custom microservices in a programming language of choice and then add business logic for their process. Example embodiments further allow consumers to deploy their custom microservice in a cloud account and register the custom microservice with a microservice registry. The framework described herein comprises debugging, lifecycle management, and logging and audit features.

Figure 1:
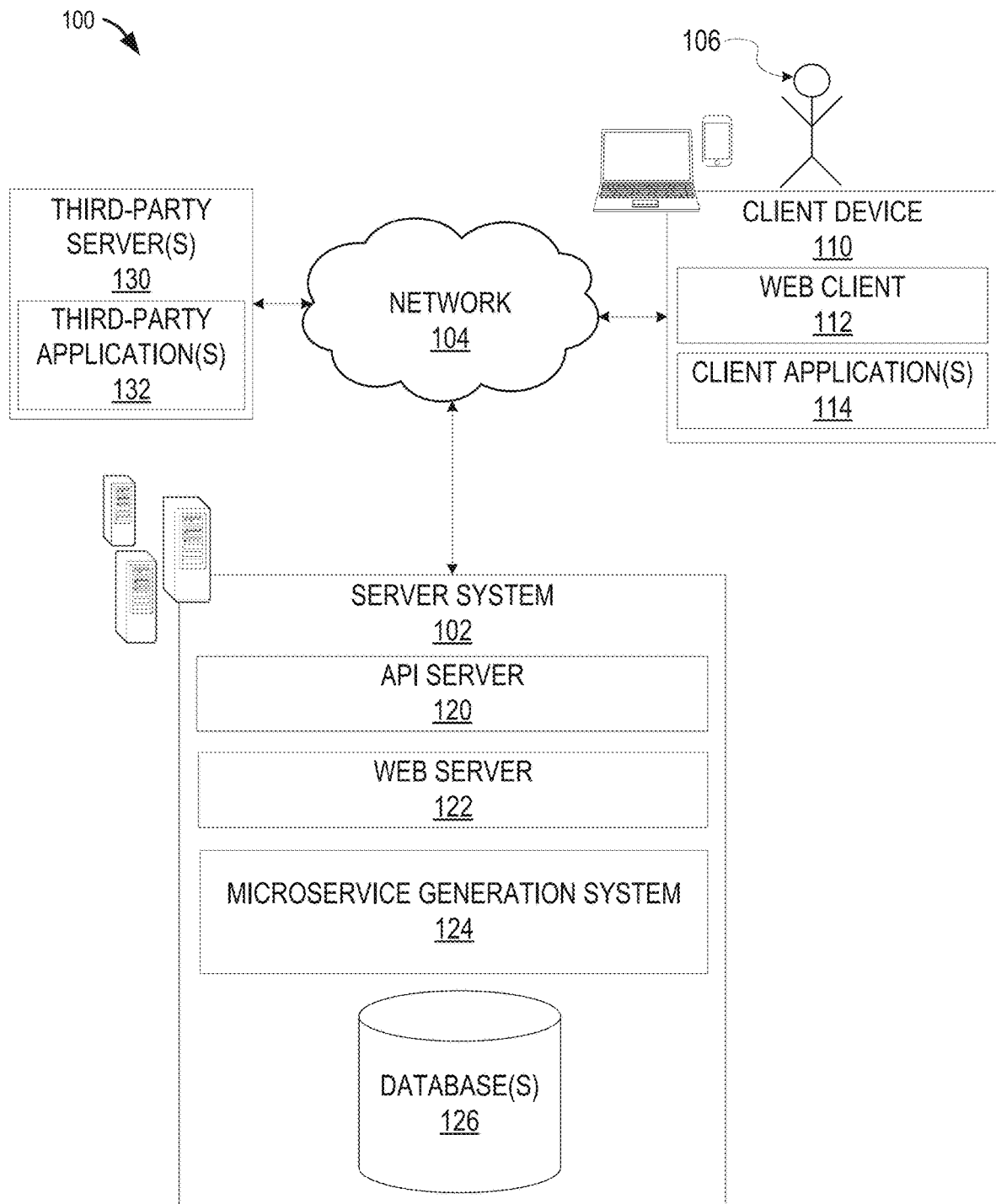
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics design application, a custom microservice generation application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, access test data, access a custom microservice template, and so forth). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and a microservice generation system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The microservice generation system 124 may provide back-end support for third-party applications 132 and client applications 114, which may include cloud-based applications. The microservice generation system 124 generates templates for custom microservices and supporting functionality, as described in further detail below. The microservice generation system 124 may comprise one or more servers or other computing devices or systems.

The system 100 further includes one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide access to templates for custom microservices and corresponding functionality that is supported by relevant functionality and data in the server system 102.

Figure 2:
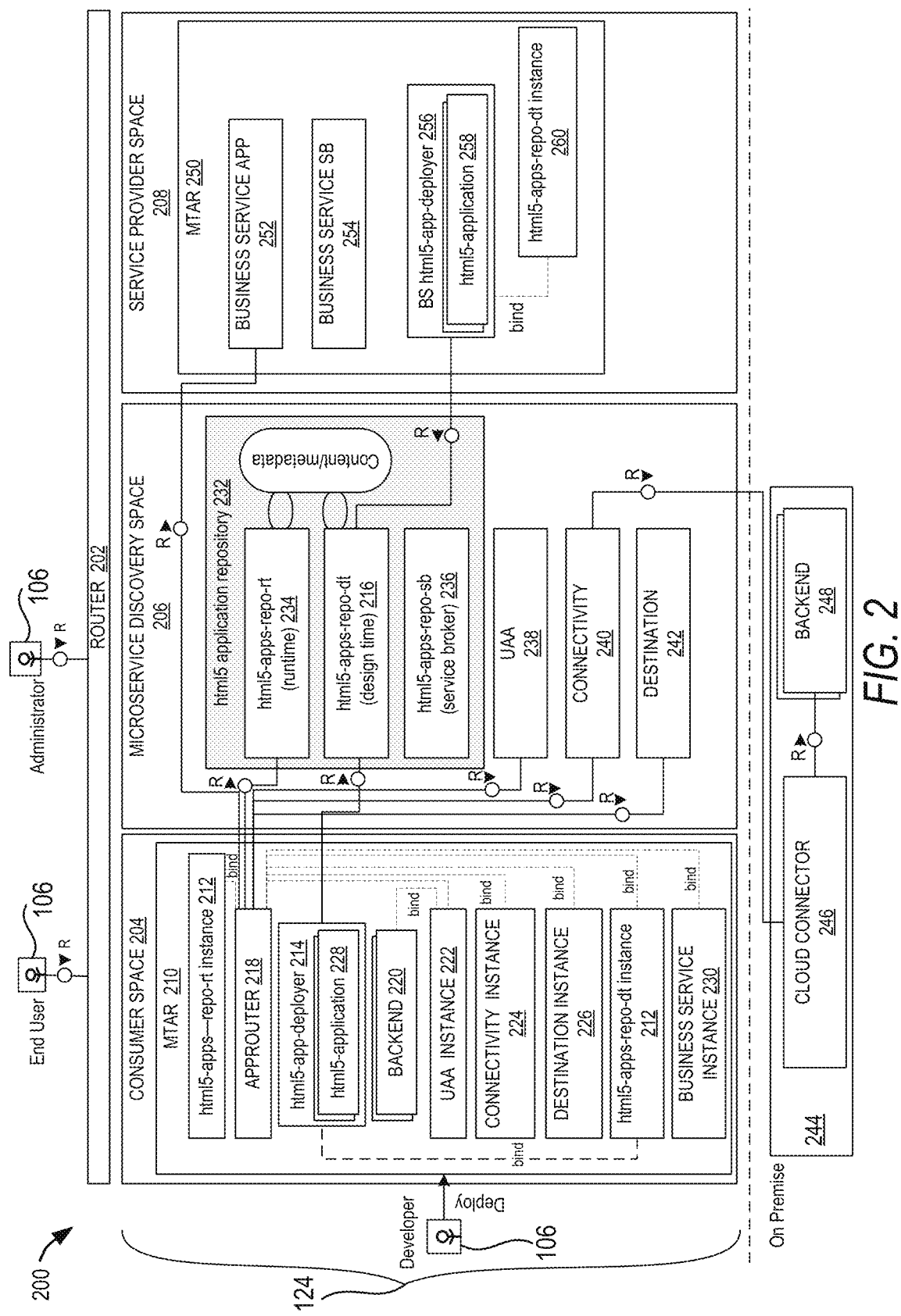
FIG. 2 is a block diagram illustrating an architecture of a custom microservice generation system, according to some example embodiments.

FIG. 2 is a block diagram illustrating an architecture 200 of a microservice generation system 124, according to some example embodiments. In one example, one or more users 106 can access the microservice generation system 124 via a router 202, or directly (e.g., a developer as shown). The microservice generation system 124 can also be accessed via an on-premise system 244, in another example. The on-premise system 244 may comprise a cloud connector 246 and a backend 248.

The microservice generation system 124 is illustrated as having three separate spaces: a consumer space 204, a microservice discovery space 206, and a service provider space 208. It is to be understood that these spaces may all reside in a public or private cloud, locally on a server system, as more or fewer spaces, and the like. Also, each space may be associated with a different entity. For example, the consumer space 204 may be associated with a particular consumer or customer and owned by the particular consumer or customer, and the microservice discovery space 206 and service provider space 208 may be associated with a cloud service, predictive maintenance and service system, or the like. In one example embodiment, the consumer space 204 resides on a server system of the consumer (e.g., third-party server 130) and the microservice discovery space 206 and service provider space 208 reside on a server system 102 (e.g., microservice generation system 124).

The consumer space 204 comprises components of a custom microservice and components used to interact, deploy, and register the custom microservice in the microservice discovery space 206 and the service provider space 208. For example, the consumer space 204 comprises a container 210 such as a multitarget application archive (MTAR) or other means of packaging a custom microservice. The container 210 comprises a number of components. An html-apps-repo-rt instance 212 is a service which serves up user interface (UI) content of the custom microservice. The html5-app-deployer 214 deploys UI code into the microservice discovery space 206 when the custom microservice is deployed and the UI code is stored on the microservice discovery space 206 in html5-apps-repo-dt (design time) component 216. The UI code or components are custom developed by the customer and/or by using UI templates provided by the microservice discovery space 206.

The approuter 218 is used to receive and process requests from the end user and forward them to the microservice discovery space 206, service provider space 208, or consumer space 204. In one example, every request for the custom microservice goes through the approuter 218. For example, each time a user makes an HTTP request (e.g., to load a UI component, to make a request to the backend to fetch data through one or more APIs), each request will go through the approuter 218. For instance, the approuter 218 analyzes the metadata for each request to determine where the request should be routed to get the content for the request. For example, the approuter 218 can determine that the content belongs to the custom microservice and thus should be routed to the local consumer space, or that the content belongs to core microservices and should be routed to the service provider space 208, as examples.

The backend 220 is part of the custom aspects of the custom microservice developed by the consumer. For example, the backend 220 may comprise REST APIs that are callable via HTTP for any services that the custom microservice offers for fetching data or triggering actions via REST HTTP services. In another example, the backend may comprise calculations, consumer data sources, an adapter to connect to consumer data sources, and the like. In one example, the backend 220 preforms operations related to configuration management, data management, and so forth.

The user authorization and authentication (UAA) instance 222 is responsible for authorization and authentication for the custom microservice. In one example the UAA instance 222 provides roles and scopes that could be used to protect the rest end points of the backend. These APIs are managed and verified through the UAA instance 222. In one example, the UAA instance 222 is provided by the cloud service, predictive maintenance and service system, or the like.

The connectivity instance 224 and destination instance 226 allow for more complex routings. For example, the connectivity instance 224 and destination instance 226 may be used for routing outside of the microservice generation system 124, for specific authorization settings, and so forth. In one example, the connectivity instance 224 and destination instance 226 are provided by the cloud service, predictive maintenance and service system, or the like.

The business service instance 230 allows for a custom microservice to be exposed as a business service to allow other consumers or customers (also referred to herein as a tenant or tenants) to discover or subscribe to the custom microservice, if desired by the developer of the custom microservice.

The microservice discovery space 206 also comprises a number of components, including html5 applications repository 232. The html5 applications repository 232 comprises an html5-apps-repo-rt (runtime) component 234, an html5-apps-repo-dt (design time) component 216, and an html5-apps-reo-sb (service broker) component 236. The microservice discovery space 206 further comprises a UAA component 238, a connectivity component 240, and a destination component 242.

The service provider space 208 comprises a container 250 (e.g., an MTAR) that comprises a business service app 252, a business service SB 254, a BS-html5-app-deployer 256 comprising html5-application 258, and an html5-apps-repo-dt instance 260.

Figure 3:
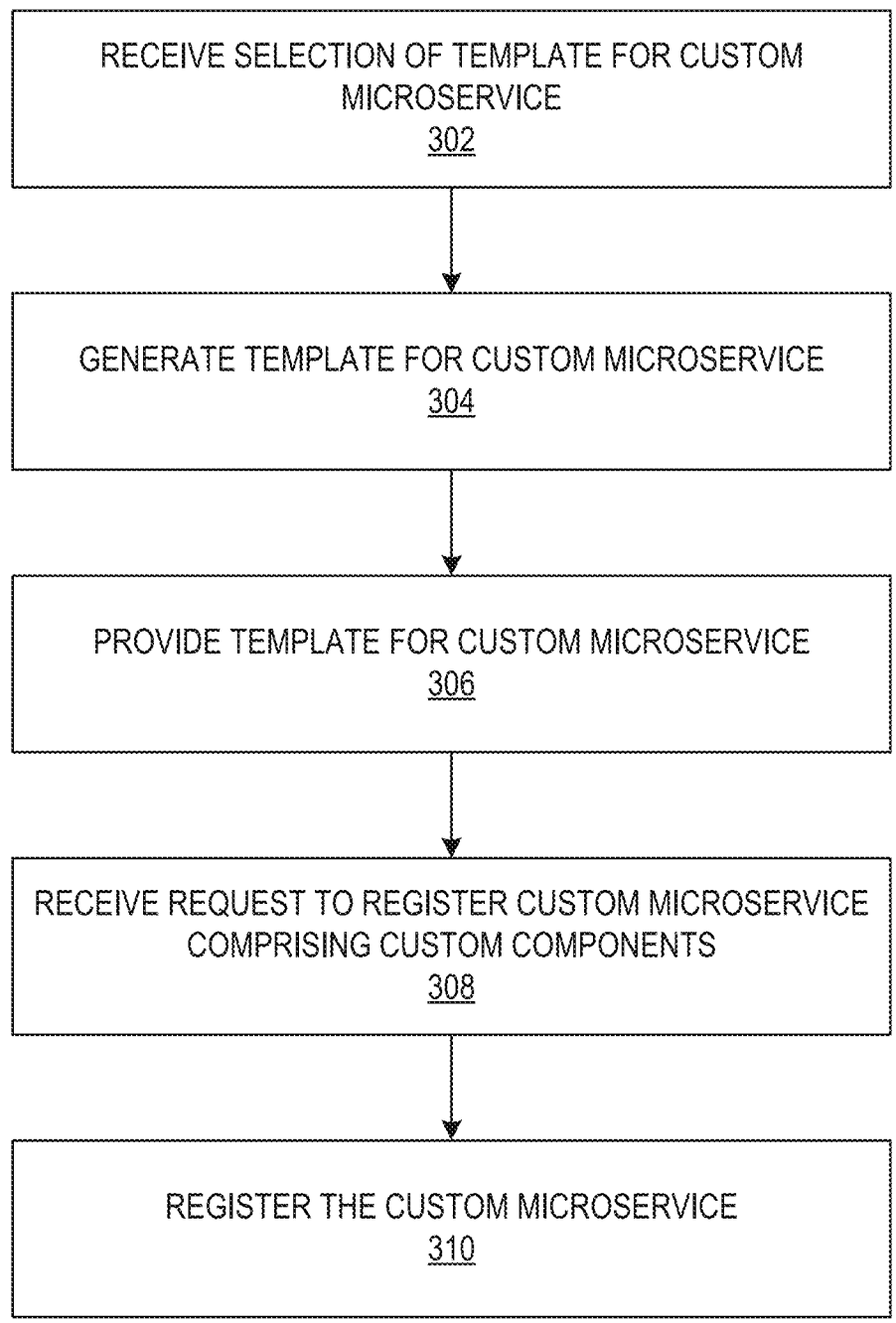
FIG. 3 is a flow chart illustrating aspects of a method for processing a log file, according to some example embodiments.

FIG. 3 is a flow chart illustrating aspects of a method 300 for generating a custom microservice, according to some example embodiments. For illustrative purposes, method 300 is described with respect to the networked system 100 of FIG. 1 and block diagram of FIG. 2. It is to be understood that method 300 may be practiced with other system configurations in other embodiments.

Figure 4:
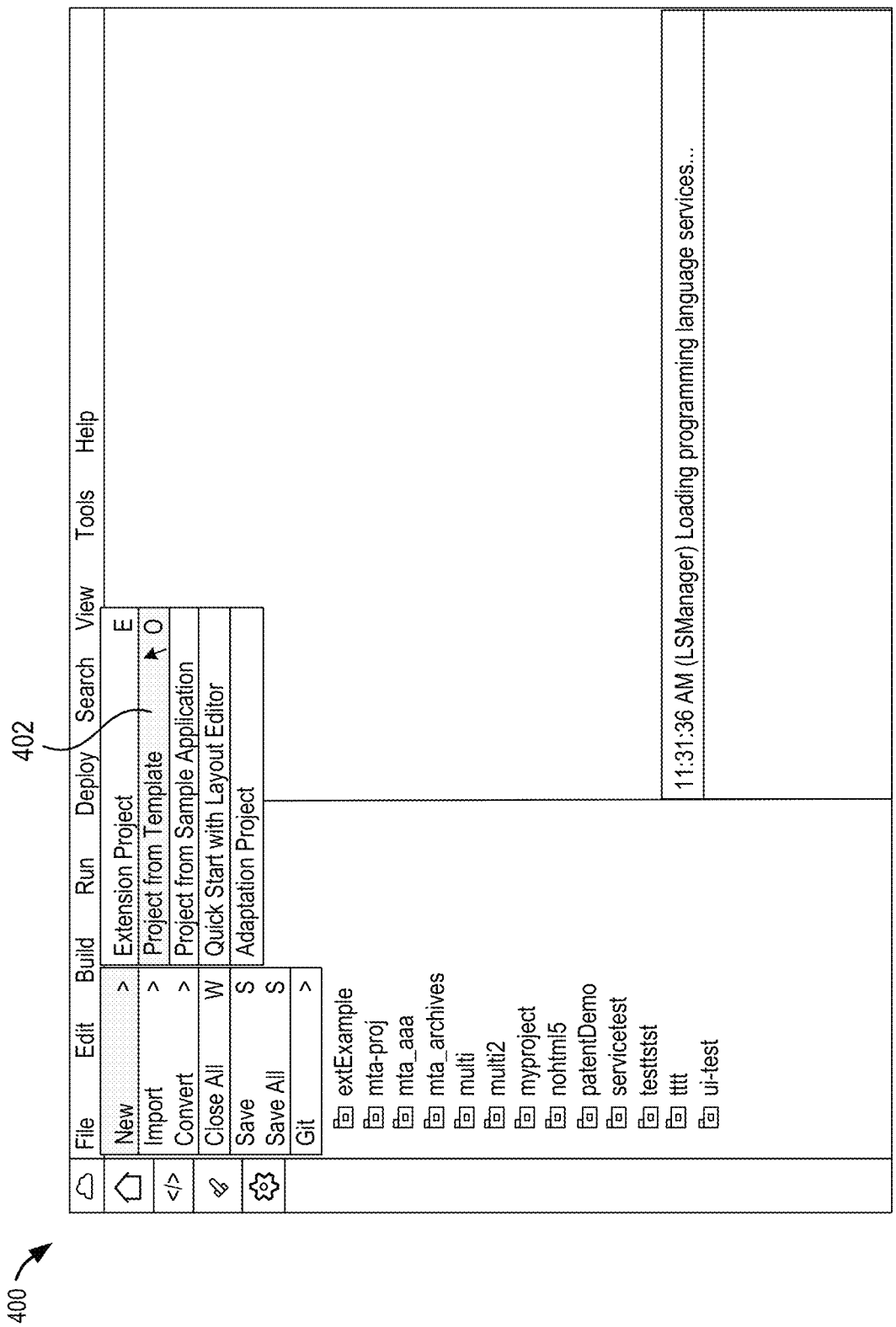
Figure 5:
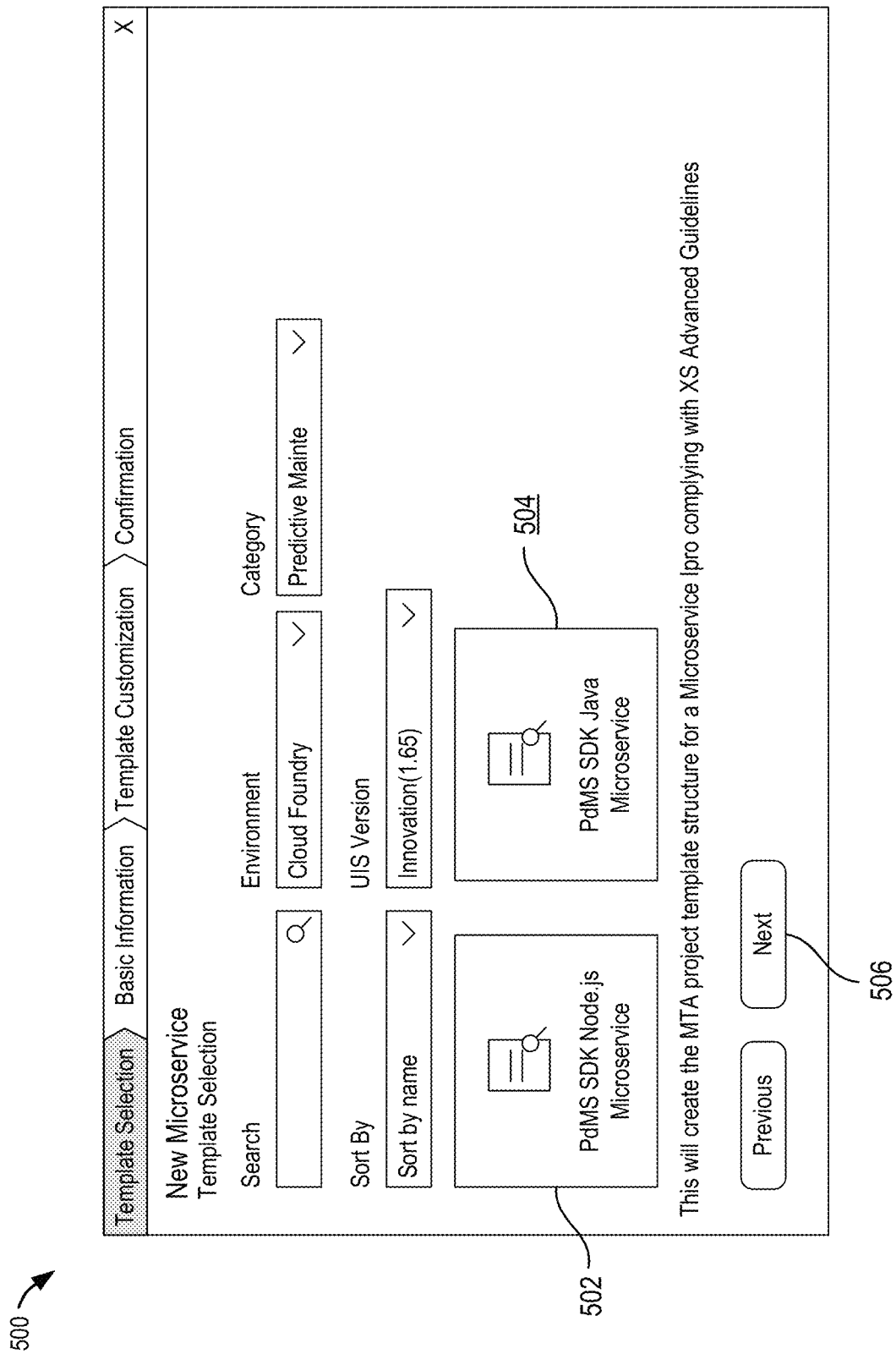

In operation 302, a computing system (e.g., server system 102 or microservice generation system 124) receives, from a computing device (e.g., client device 110 or via third-party server 130), a selection of a template for a custom microservice and configuration parameters for the custom microservice. For example, in one example embodiment, the computing system provides a plurality of templates for a user developing a custom microservice to choose from. In one example embodiment, the computing system causes a user interface (UI) to display on the computing device to allow a user to start a new project to develop a new custom microservice and select a template for the project. FIG. 4 illustrates an example UI 400 displayed on a computing device that allows a user to select a new project from template option 402. Once the user selects the new project from template option 402, the computing system causes a template selection UI 500 to display on the computing device, as shown in FIG. 5. In the template selection UI 500, two example templates are shown based on programming languages. For example, template 502 is provided for developing a new custom microservice in Node.js and template 504 is provided for developing a new custom microservice in Java. It is to be understood that other types of templates can be provided in addition or alternatively. For instance, the template selection UI 500 may provide industry-specific templates that each enable particular visualizations for the specified industry. For example, a template can be provided with standard visualizations such as a manufacturing floor UI, a three-dimensional model, a transformer analysis, an analysis of sensor status for a particular type of asset (e.g., airplane, wind turbine), and so forth. A user can then select the template desired via the template selection UI 500 and select a next option 506.

Figure 6:
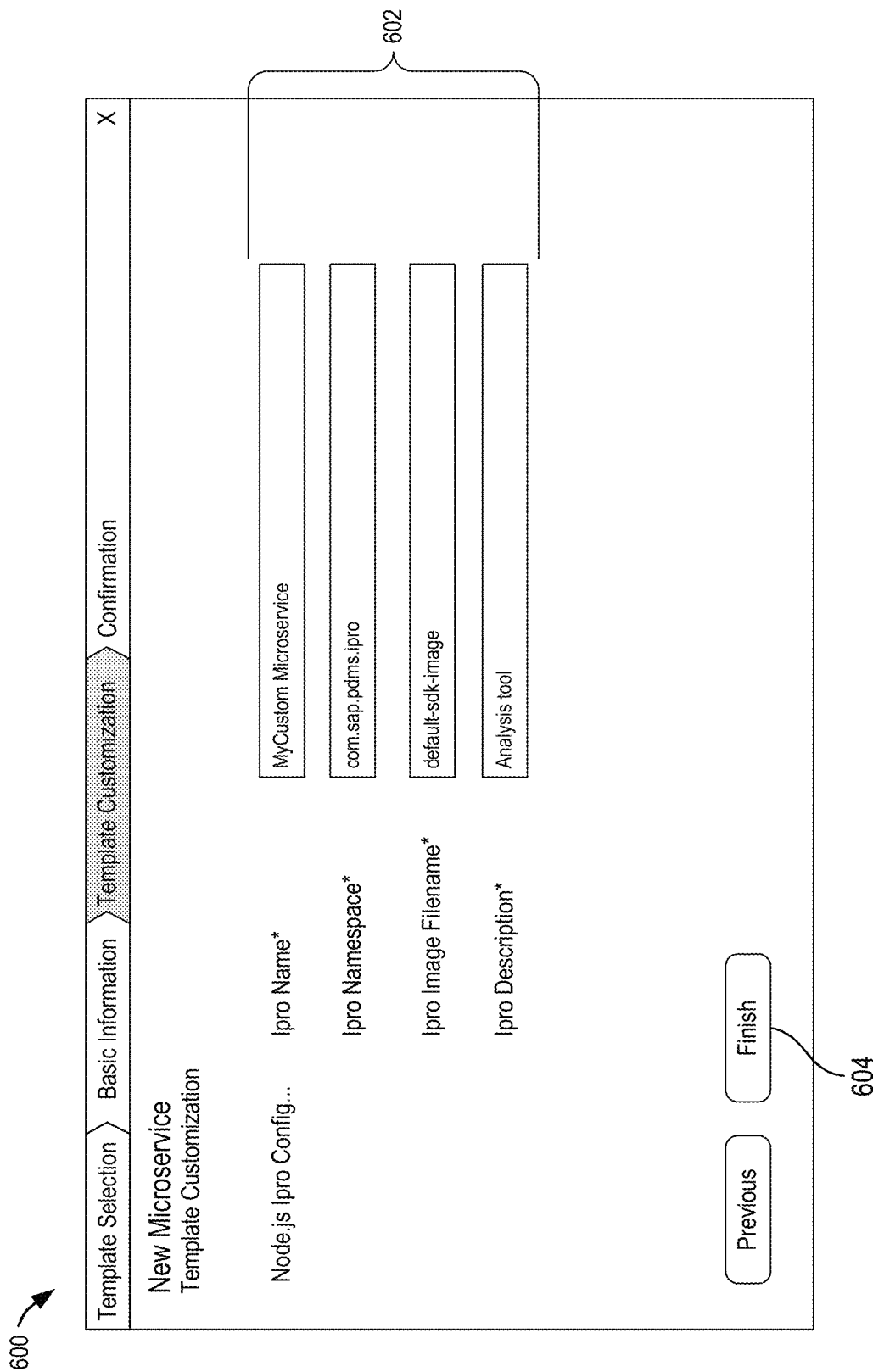

In one example, the computing system causes UI 600 to display on the computing device that prompts a user to enter some configuration information or parameters 602, as shown in FIG. 6. In the example UI 600, the configuration parameters 602 include a name for the custom microservice, a namespace for the custom microservice, an image for the custom microservice, and a description for the custom microservice. In other example embodiments, more or less configuration parameters may be used. Once a user enters configuration parameters 602, the user can select a finish option 604 to generate the template for the custom microservice.

Returning to FIG. 3, in operation 304, the computing system generates the template for the custom microservice using the configuration parameters. For example, the computing system accesses one or more data stores (e.g., database 126) to retrieve the template for the custom microservice and uses the configuration parameters to populate associated parameters in the template for the custom microservice. In one example, the configuration parameters (e.g., name space, and so forth) are used in templating while generating the code for the template.

In one example, the template for the custom microservice comprises defined interfaces for accessing core microservices, defined integration points for integration with a system providing the core microservices, and stubs for custom components for the custom microservice. In one example, the template for the custom microservice further comprises an authorization and authentication instance for defining authorization and authentication for the custom microservice. In yet another example, the template for the custom microservice further comprises a connectivity instance storing connectivity data defining how to connect to external systems for data or microservices used by the custom microservice. In another example, the template for the custom microservice further comprises example code and stubs for various UIs for the custom microservice to appear in an explorer UI, as a visual card, as a tile, and so forth as explained in further detail below.

Figure 7:
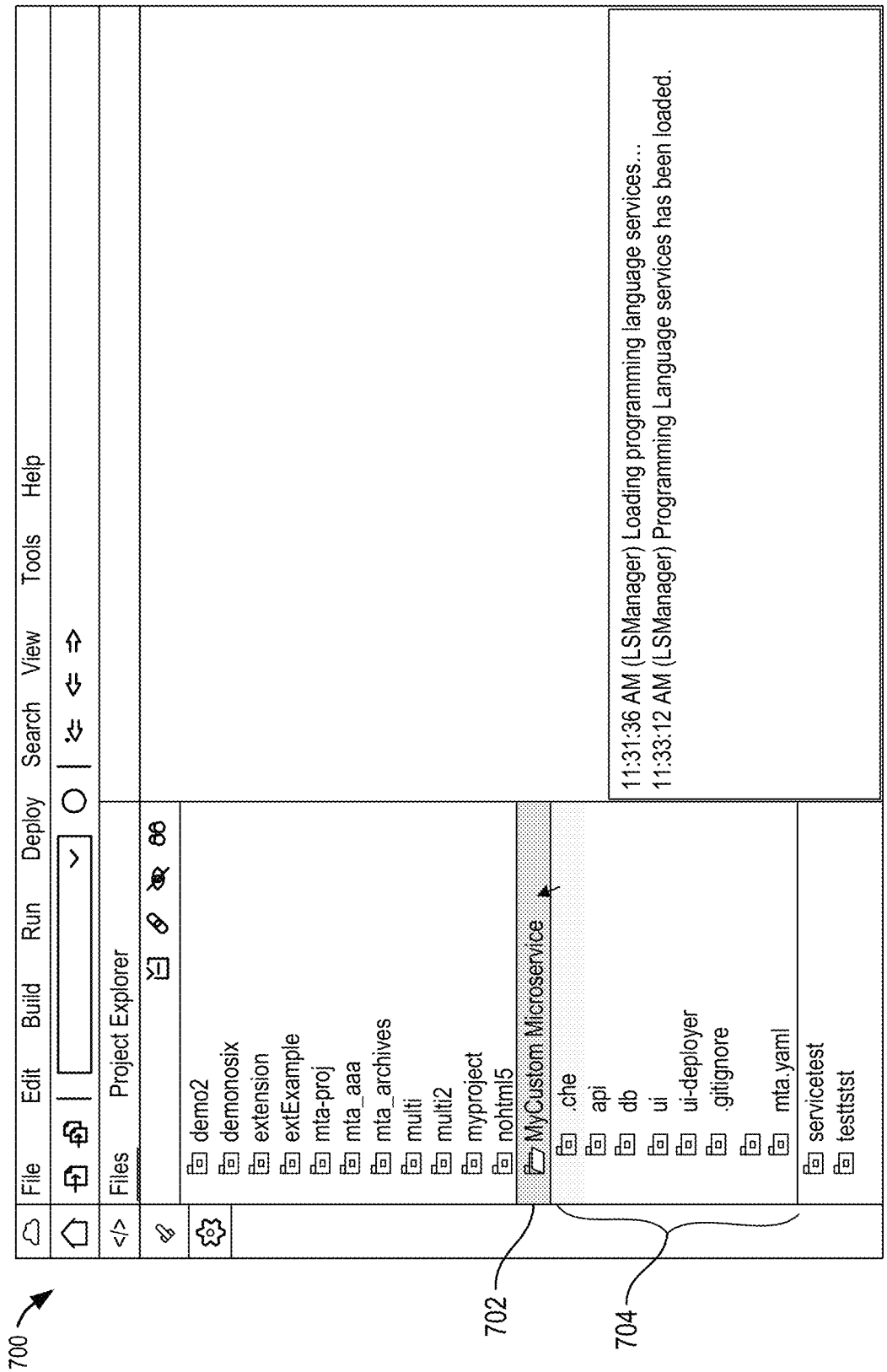

In operation 306, the computing system provides the template for the custom microservice to the computing device. For example, the computing system causes display of the new project for the custom microservice on the computing device. FIG. 7 illustrates an example UI 700 that shows the new project 702 that was created that comprises the template for the custom microservice. In this example, the template has a number of subfolders and metadata 704. The API subfolder corresponds to the backend 220 of FIG. 2 and described above. The API is initially populated with some authorization components and configuration APIs. A user can then revise the authorization components and configuration APIs, if needed, and add custom components to the API subfolder (e.g., add code related to the user's processes to the API subfolder). For instance, the backend 220 or API may comprise REST APIs that are callable via HTTP for any services that the custom microservice offers for fetching data or triggering actions via REST HTTP services. In another example, the backend 220 may comprise calculations, consumer data sources, an adapter to connect to consumer data sources, and the like. In one example, the backend 220 preforms operations related to configuration management, data management, and so forth. The API subfolder comprises sample code and stubs that can be customized by the user.

In one example, a user may wish to develop a custom microservice to visualize machines on a manufacturing floor and the status of each machine. Thus, the user can develop APIs to fetch an image file of the manufacturing floor, an API to fetch the health scores from one or more data stores for each machine, and so forth.

The db subfolder contains database artifacts for configuration by the user. The UI subfolder contains example UI components that can be configured by the user or rewritten by the user. For example, the UI subfolder may comprise code for one or more example UI (e.g., a list, pie chart, bar chart, combination of charts). The UI subfolder also includes integration points for integrating into a UI comprising other microservices, as described in further detail below. In this way the user does not need to worry about any integration details within the system and can instead focus on the custom aspects of the microservice. For example, using the manufacturing floor example above as UI components, the user can include ways to display the manufacturing store and machine status (e.g., display of machines on floor, color coding based on health score).

The ui-deployer subfolder comprises code for deploying the UI to an HTML 5 repository (e.g., the html5 applications repository 232 of FIG. 2). The template further comprises additional metadata files, such as gitignore, and mta.yaml. The metadata files comprise code that will enable the new custom microservice to integrate and interact seamlessly within a microservice system (e.g., predictive maintenance and services system) and with other core microservices provided by the microservice system. For example, the new custom microservice can accept broadcasted semantics from the microservice system or core microservices, broadcast any events that would be accepted by the microservice system or core microservices, and the like. In another example, metadata files contain dependencies between components and between custom components and standard components (e.g., public dependencies, open-source dependencies, dependencies specific to the microservice system). A user can add additional dependencies for the custom microservice.

Figure 8:
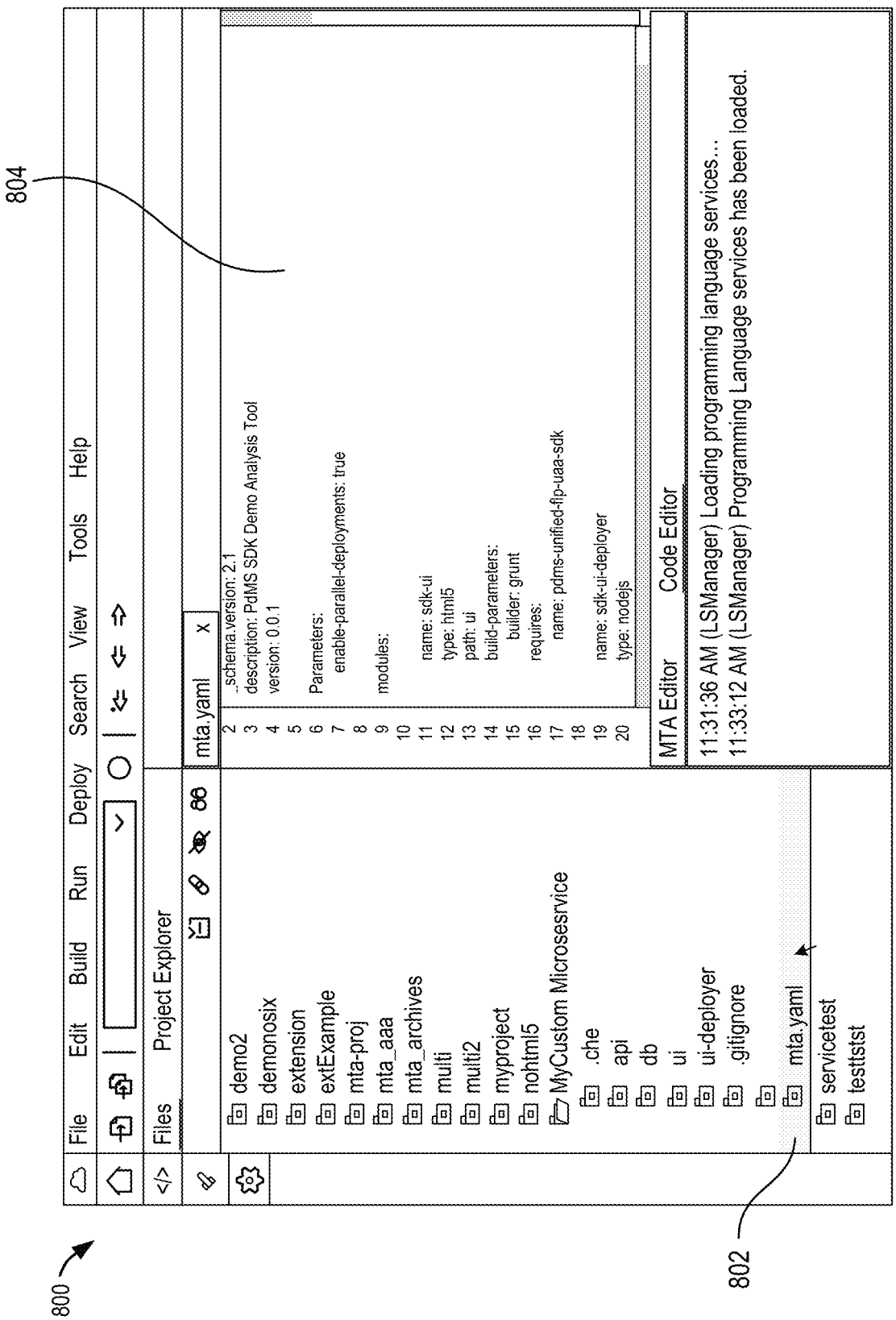

FIG. 8 illustrates an example UI 800 showing how code is displayed when a subfolder or file is selected in the template. In the example UI 800, a metadata file "mta.yaml" 802 is selected, and in response, code 804 is displayed. In this example, the code defines modules that belong to the custom microservice that a user can review, modify, or to which the user can add additional code. The .che subfolder contains metadata about a project.

As described above, the custom microservice template comprises defined interfaces for accessing core microservices, defined integration points for integration with a system providing the core microservices, stubs for custom components for the custom microservice, and so forth. Accordingly, the user only needs to add custom components specific to their business scenario to the template or revise example code provided. For example, the user can add custom components using the stubs for the custom components that are included in the template.

Once the user has finished adding custom components (e.g., code) to the template, the user can test the custom microservice using testing and debugging components provided in the template. For example, the custom microservice template further comprises standard test cases, test tools, and stubs for custom test cases. The user can use the standard test cases to test the functionality of the custom microservice and/or write custom test cases to test the functionality of the custom microservice.

Figure 9:
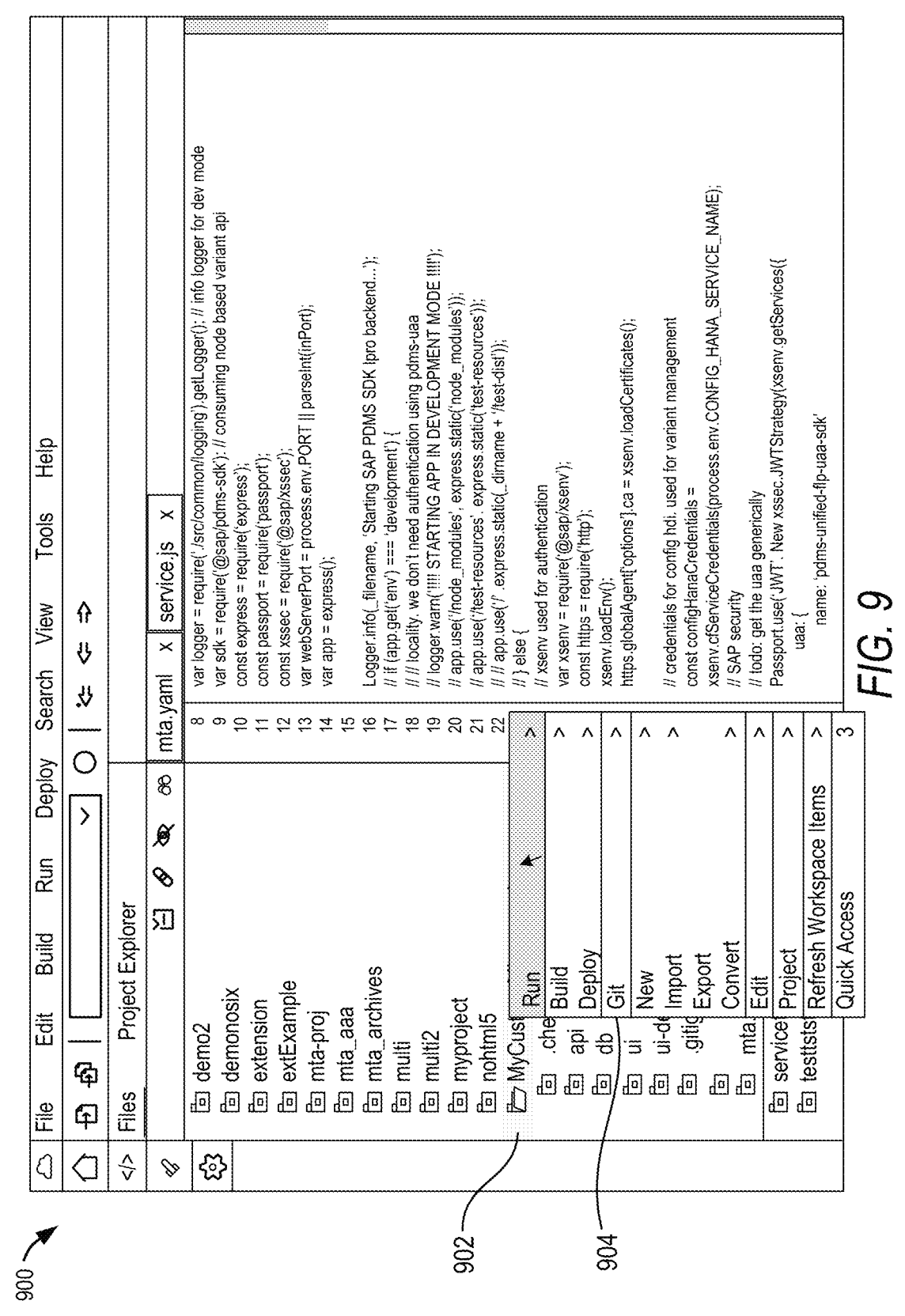

The user can also choose to run the custom microservice, build the custom microservice, deploy the custom microservice, and so forth, as shown in the example UI 900 of FIG. 9. For example, the user can right-click on the project folder 902 to get options 904 for running the microservice, building the microservice, deploying the microservice, importing or exporting, and so forth.

The custom microservice can be generated using a build script of the template which generates a container (e.g., MTAR) that can then be deployed as a new custom microservice that can be used by other users associated with the consumer or other entities. When the user deploys the new customer microservice, a request to register the custom microservice is sent to the computing system.

Returning to FIG. 3, in operation 308, the computing system receives a request from the computing device to register the custom microservice comprising the custom components, and registers the custom microservice to be exposed to and accessed by a tenant with authorization to access the custom microservice along with the core microservices, in operation 310. For example, registering the custom microservice may comprise generating an approuter 218 for the custom microservice, storing UI components corresponding to the custom microservice, and so forth. After the custom microservice is registered, the computing system causes the custom microservice to be accessible along with core microservices by users (e.g., via computing devices). For example, the computing system may cause the custom microservice to be displayed along with core microservices in a UI of a computing device requesting access to the microservice and core microservices. Deployment, registration, and access for the custom microservice are described in further detail below.

Figure 10:
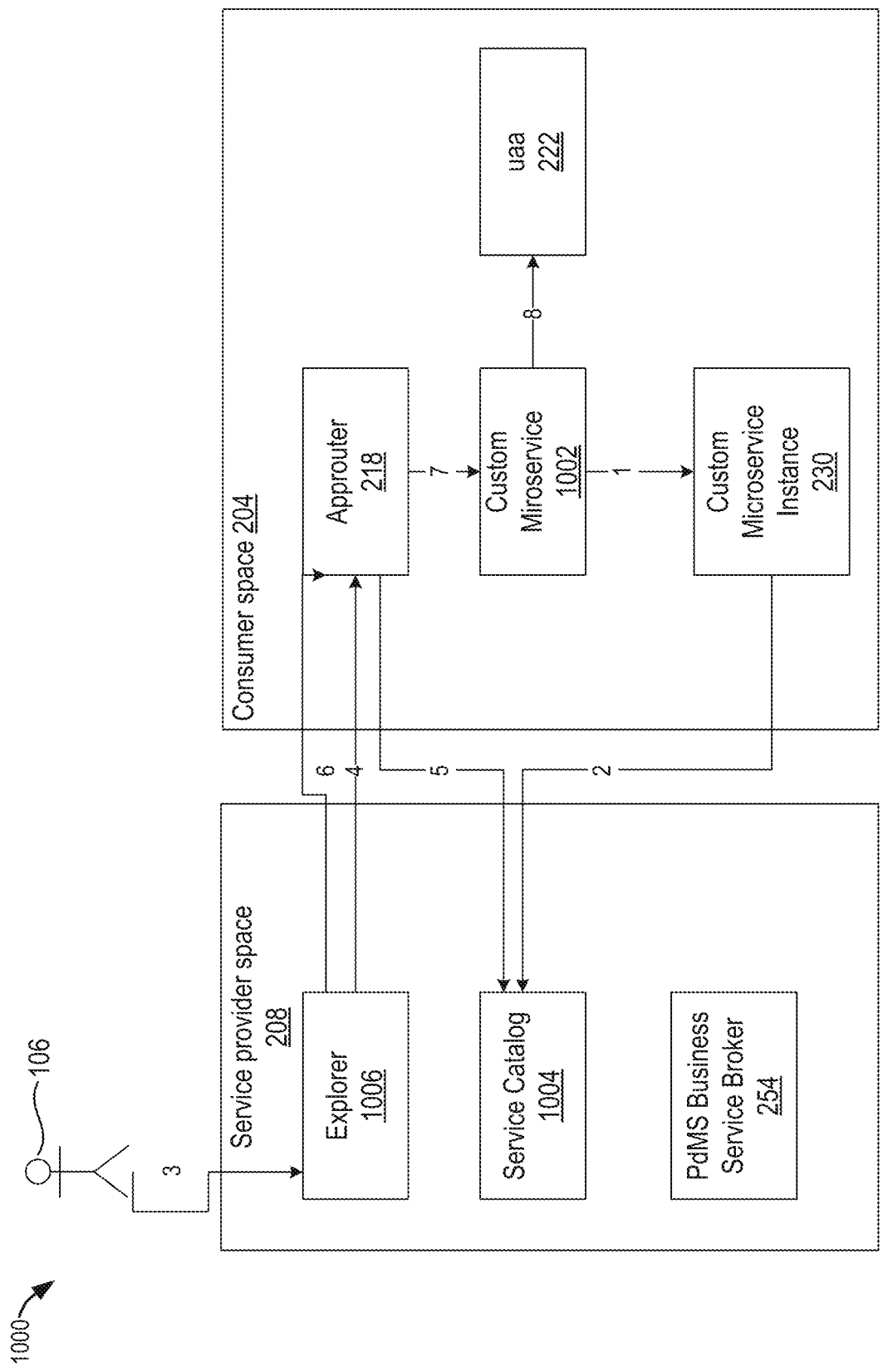
FIG. 10 is a block diagram illustrating deployment, registration, and providing access to a custom microservice, according to some example embodiments.

FIG. 10 is a block diagram illustrating deployment, registration, and providing access to a custom microservice, according to some example embodiments. When a custom microservice 1002 is deployed, the custom microservice 1002 binds to a microservice instance (e.g., an application (e.g., pdms instance) in the consumer space 204 as a microservice instance (corresponding to the business service instance 230 of FIG. 2), as shown in operation 1 of FIG. 10. During the binding, the custom microservice (e.g., business service instance 230) provides its service registration details, which are inserted into the service catalog 1004, as shown in operation 2. For example, the business service instance 230 sends a message to the service catalog 1004 to register the new custom microservice 1002. In one example embodiment, the service registration details are specific to the tenant registering the custom microservice such that the custom microservice gets added to the service catalog only for that tenant.

Figure 11:
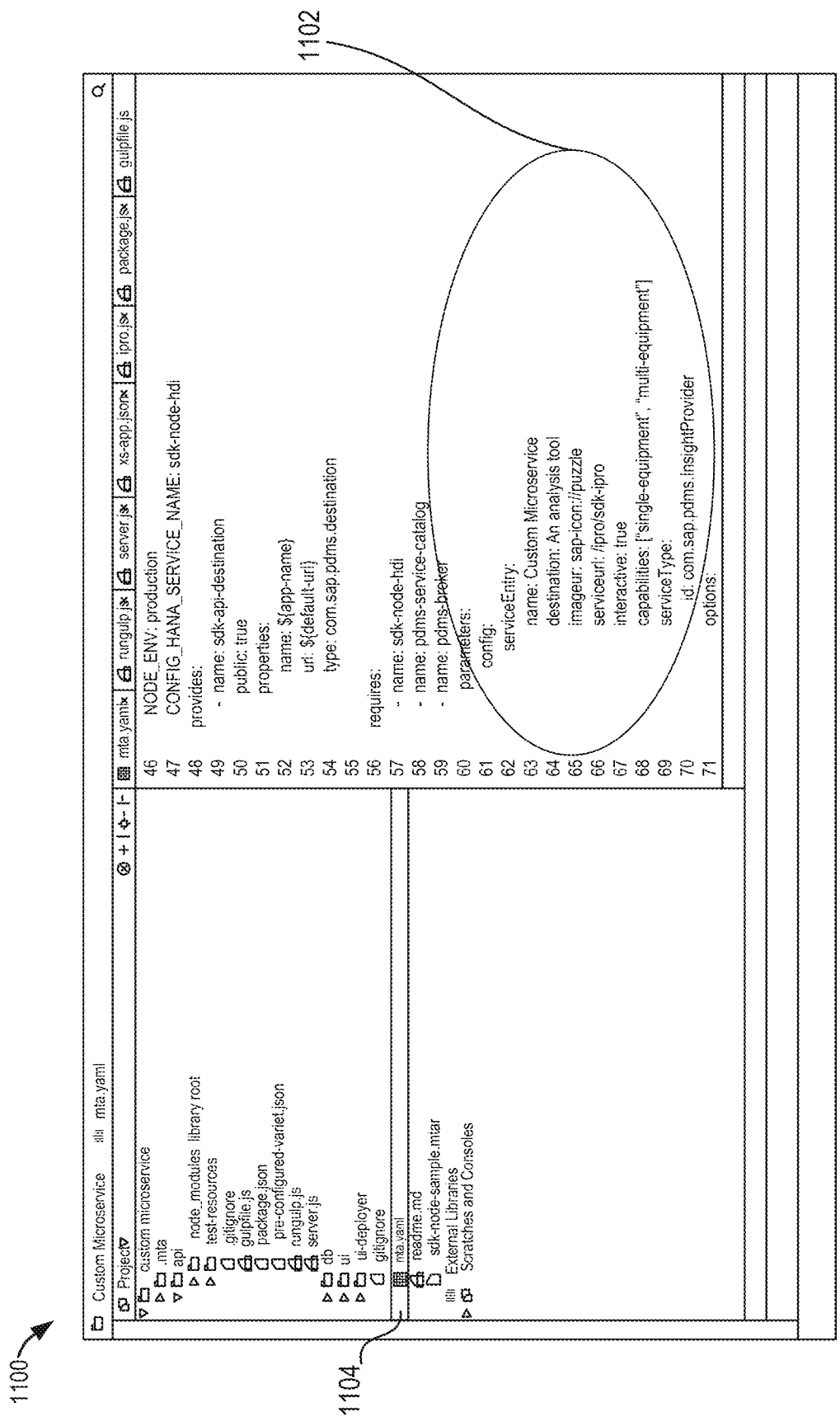
FIG. 11 illustrates an example user interface, according to some example embodiments.

In one example, the registrations details are based on configuration parameters, as explained above. For example, the configuration details are included in the custom microservice template, and thus in the custom microservice. FIG. 11 illustrates an example UI 1100 including code for a custom microservice that includes metadata 1104 comprising configuration parameters 1102 that can be used as registration information. The example configuration parameters 1102 comprise a name for the custom microservice (e.g., "custom microservice"), a description for the custom microservice, an image URL that can be displayed next to the description name in the service catalog, a service URL where the custom microservice can be reached, and some additional metadata for displaying the custom microservice. For example, the configuration parameters 1102 further comprise a service identifier (ServiceType: id) and an application identifier (appId) which are used for identifying the custom microservice in the HTML5 repository and loading UI components associated with the custom microservice.

Returning to FIG. 10, once the custom microservice is registered, an end user 106 can access the custom microservice via a user interface 1006, such as an explorer, in the service provider space 208, in operation 3. The user interface 1006 accesses the service catalog 1004 via the approuter 218, at operations 4 and 5. When the user interface 1006 accesses the service catalog 1004, the service catalog 1004 will return the tenant-specific registered custom microservice (e.g., custom analysis tool) and also core microservices (e.g., core analysis tools). In operation 6, the user interface 1006 uses routing information provided by the service catalog 1004 to make a request to the custom microservice 1002, in operation 6. The request is routed via the approuter 218 for the custom microservice, at operation 7. In one example embodiment, in order to make the routes of the custom microservice available in the approuter 218, the custom microservice is exposed as a space-scoped business service and then self-subscribed by the user or tenant.

Once the custom microservice 1002 receives the request for access, the custom microservice 1002 checks the UAA instance 222 to determine whether the user has the correct authorization and authentication scopes, in operation 8. The custom microservice 1002 uses its own scopes for authorization. If the custom microservice 1002 determines that the user is authorized to access the custom microservice, the custom microservice returns a payload which is displayed inside the user interface 1006.

Figure 12:
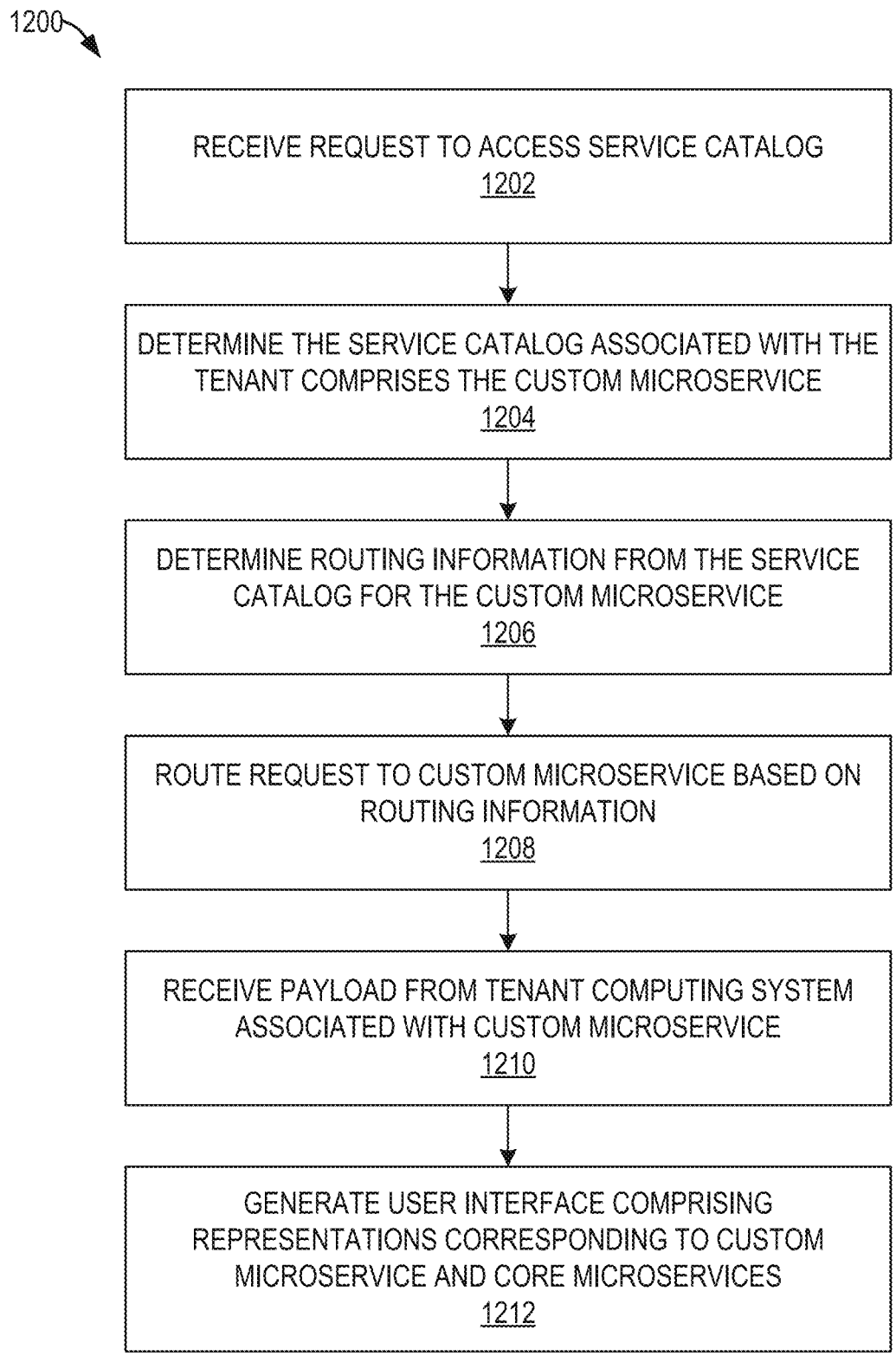
FIG. 12 is a flow chart illustrating aspects of a method for providing access to a custom microservice, according to some example embodiments.

FIG. 12 is a flow chart illustrating aspects of a method 1200 for providing access to the custom microservice, according to some example embodiments. For illustrative purposes, method 1200 is described with respect to the networked system 100 of FIG. 1 and block diagrams of FIGS. 2 and 3. It is to be understood that method 1200 may be practiced with other system configurations in other embodiments.

As described above, a computing system receives a request from a computing device associated with a tenant to register a custom microservice for the tenant based on a custom microservice template and comprising custom components. In one example, the request comprises registration information for the custom microservice, such as a name for the custom microservice, a namespace for the custom microservice, an image for the custom microservice, or a description for the custom microservice. As also described above, the computing system registers the custom microservice with a service catalog by inserting the registration information into the service catalog to be exposed to and accessed by the tenant. In one example embodiment, the service catalog is specific to the tenant registering the custom microservice and the custom microservice is accessible via the service catalog only by the tenant. In one example embodiment, the custom microservice is accessible via the service catalog only by tenants in a network specified by the tenant.

In operation 1202, the computing system receives a request to access the service catalog from a computing device associated with the tenant (e.g., the computing device associated with a user with authorization to access the custom microservice and the core microservices of the service catalog). For example, a user 106 sends a request via a user interface 1006 of a computing device to access the service catalog 1004, as shown in FIG. 10.

Figure 13:
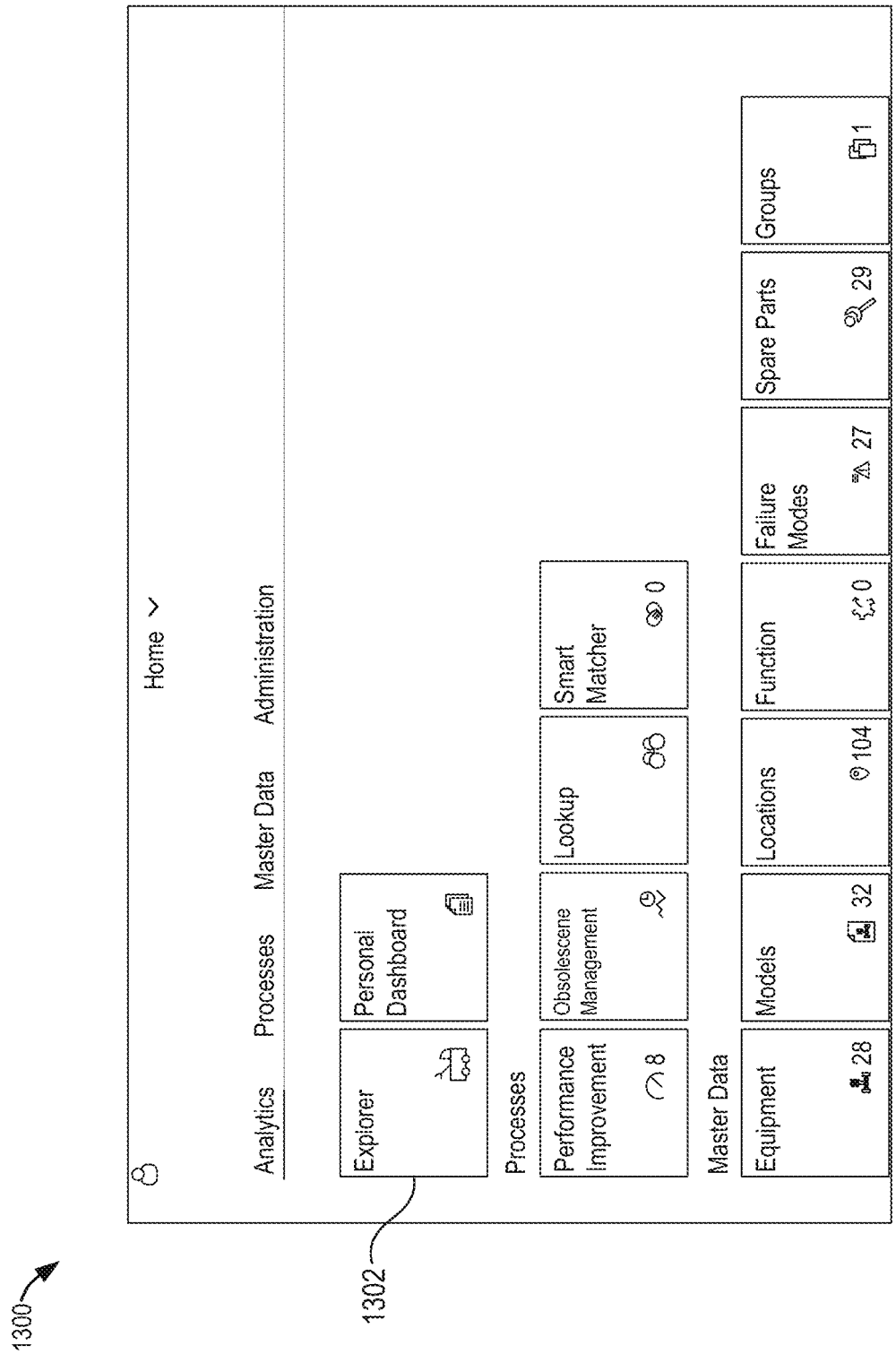

In one example embodiment, the user interface 1006 is an explorer user interface. FIG. 13 illustrates an example UI 1300 for a services launch pad that includes an option 1302 for launching an explorer user interface. Once the user selects the option 1302 for launching the explorer user interface, the computing system causes the explorer user interface to be displayed, as explained in further detail below.

Returning to FIG. 12, based on receiving the request to access the service catalog, the computing system determines that the service catalog associated with the tenant comprises the custom microservice, as shown in operation 1204. In operation 1206, the computing system determines routing information from the service catalog to make a request to the custom microservice. For example, the computing system accesses the service catalog 1004 via the custom microservice approuter 218, as shown in FIG. 10, to determine the routing information to make a request to the custom microservice.

In operation 1208, the computing system routes the request to the custom microservice based on the determined routing information. For example, the computing system routes the request via the custom microservice approuter 218 to the custom microservice 1002. In one example embodiment, the request is routed to a tenant computing system associated with the custom microservice (e.g., consumer space 204).

In operation 1210, the computing system receives a payload from the tenant computing system associated with the custom microservice. In one example the payload comprises UI components associated with the custom microservice. In another example, the payload comprising data returned from backend APIs.

In operation 1212, the computing system generates a user interface comprising representations corresponding to the custom microservice and each of the core microservices, the representation corresponding to the custom microservice based on the received payload. In one example, the computing device causes the user interface to be displayed on the requesting computing device. In this way, once the custom microservice is deployed, the custom microservice appears in and is accessible via the service catalog.

Figure 14:
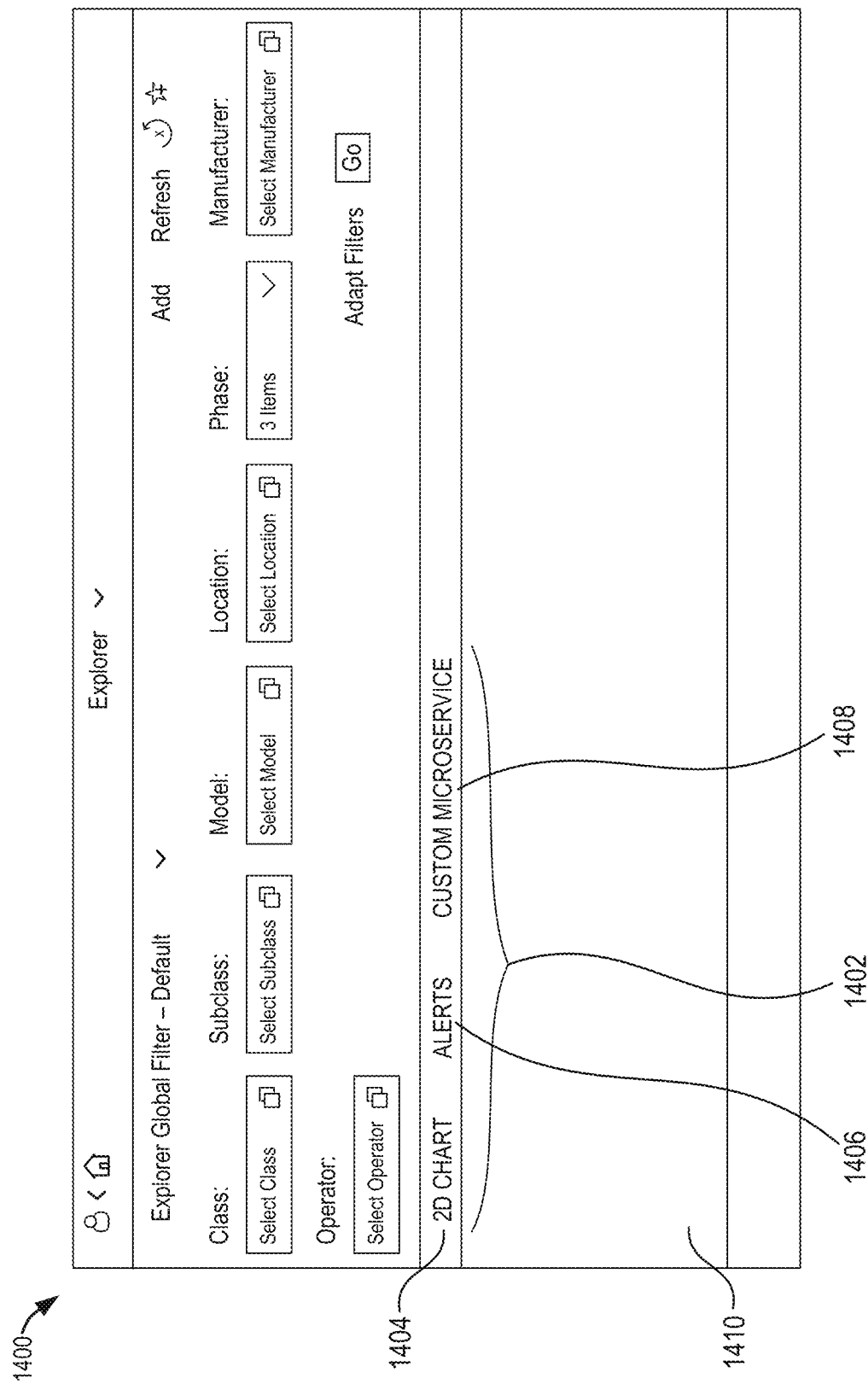

In one example embodiment, the user interface is in the form of an explorer interface, as explained above. In one example, the explorer interface provides representations corresponding to the custom microservice and each of the core microservices that are each displayed as a tab in the user interface. FIG. 14 illustrates an example explorer UI 1400 that shows a custom microservice and core microservices displayed as tabs 1402 in the explorer UI 1400. In this example, two core services 1404 and 1406 are shown along with a custom microservice 1408. The explorer UI 1400 further illustrates an area 1410 where user interface components for the selected microservice (tab) can be displayed (user interface components not shown).

Figure 15:
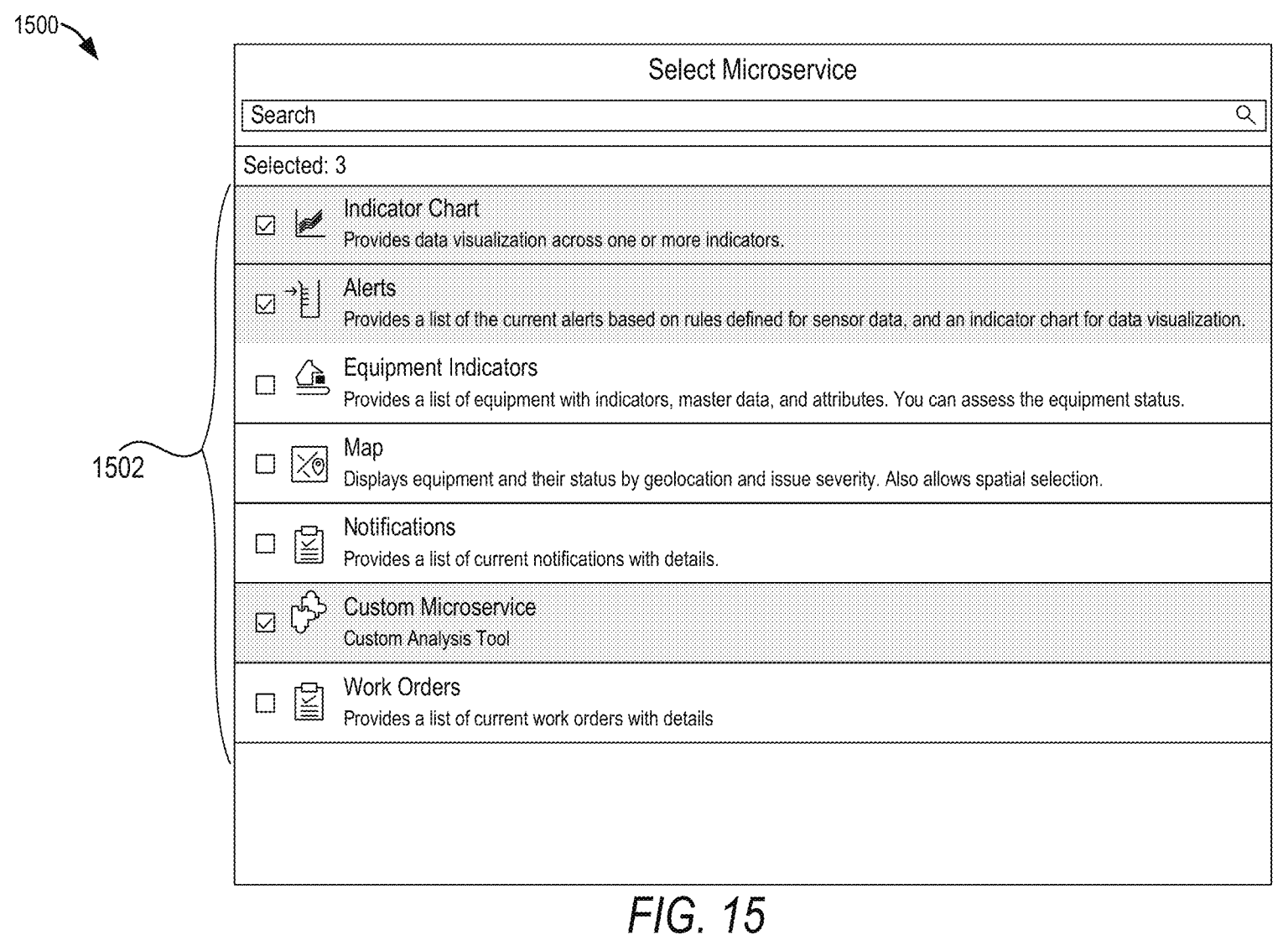

In one example, the computing system can cause a user interface for selecting the microservices to be displayed in the explorer UI 1400. FIG. 15 illustrates an example UI 1500 listing microservices 1502 that can be selected for display in the explorer UI 1400. The custom microservice template, described above, can include a template component for displaying the custom microservice in a selection list (e.g., list of microservices 1502) and/or as a tab in the explorer UI 1400 (e.g., the tab for custom microservice 1408), and a template for displaying user interface components in area 1410.

Figure 16:
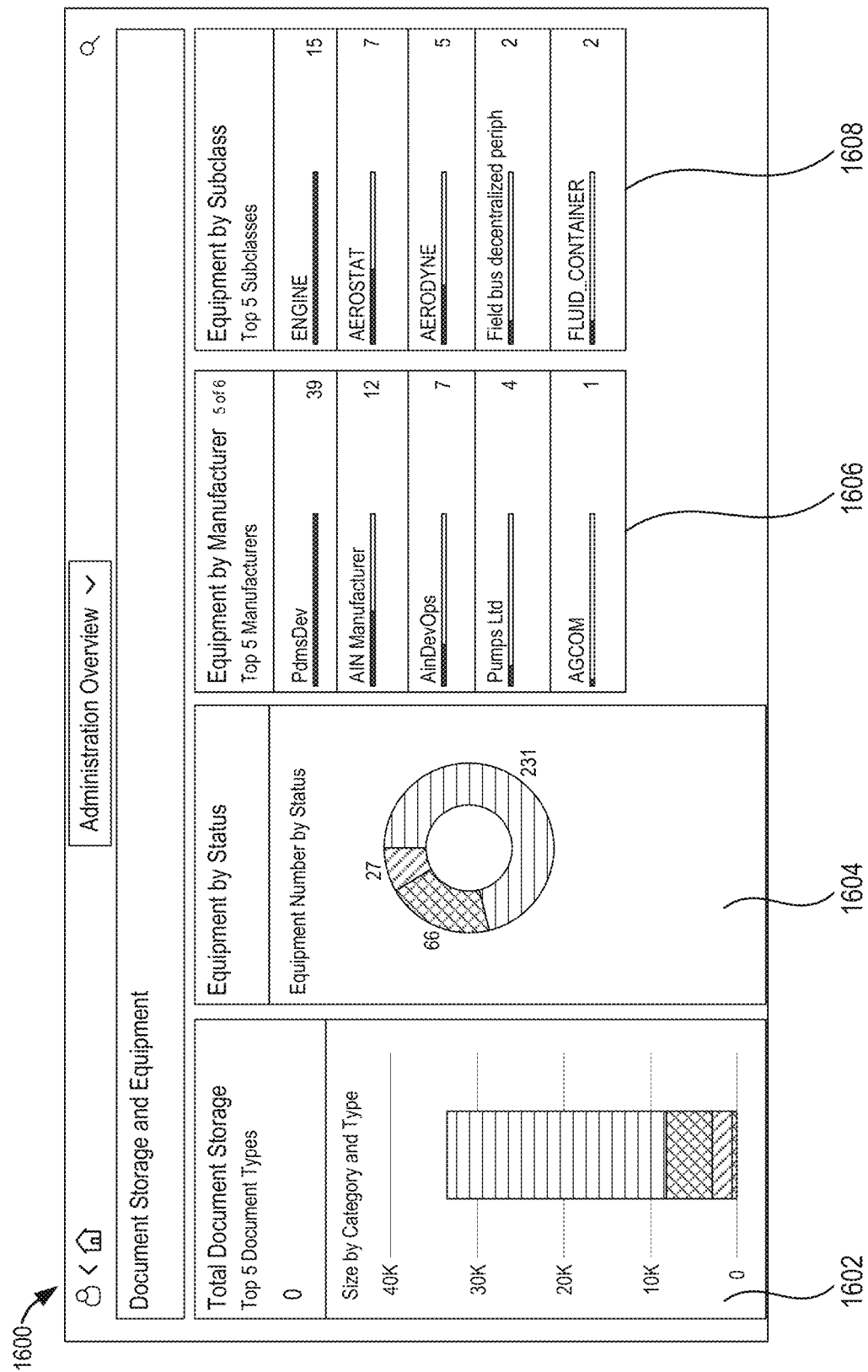

In another example embodiment, the user interface is in the form of one or more visual cards. For example, the representations corresponding to the custom microservice and each of the core microservices are each displayed as a visual card comprising at least one event associated with the microservice represented by the visual card as shown in the example UI 1600 of FIG. 16. The UI 1600 comprises four visual cards 1602, 1604, 1606, and 1608. Each visual card 1602-1608 corresponds to a microservice and shows a particular event. For example, the visual card 1604 corresponds to a microservice for equipment by status and shows a pie chart indicating how many pieces of equipment have a particular status (e.g., a first status, a second status, and a third status). Any one of the microservices may be a custom microservice or a core microservice. In one example a visual card is interactable such that a user can touch or click on any aspect to launch the microservice or a particular functionality of the microservice.

In one example, the custom microservice template, described above, can include a template component for displaying the custom microservice in a visual card comprising a particular event corresponding to the custom microservice, or an overview of the custom microservice. The visual card is then rendered according to the UI components specified in the template component for displaying the custom microservice in a visual card.

Figure 17:
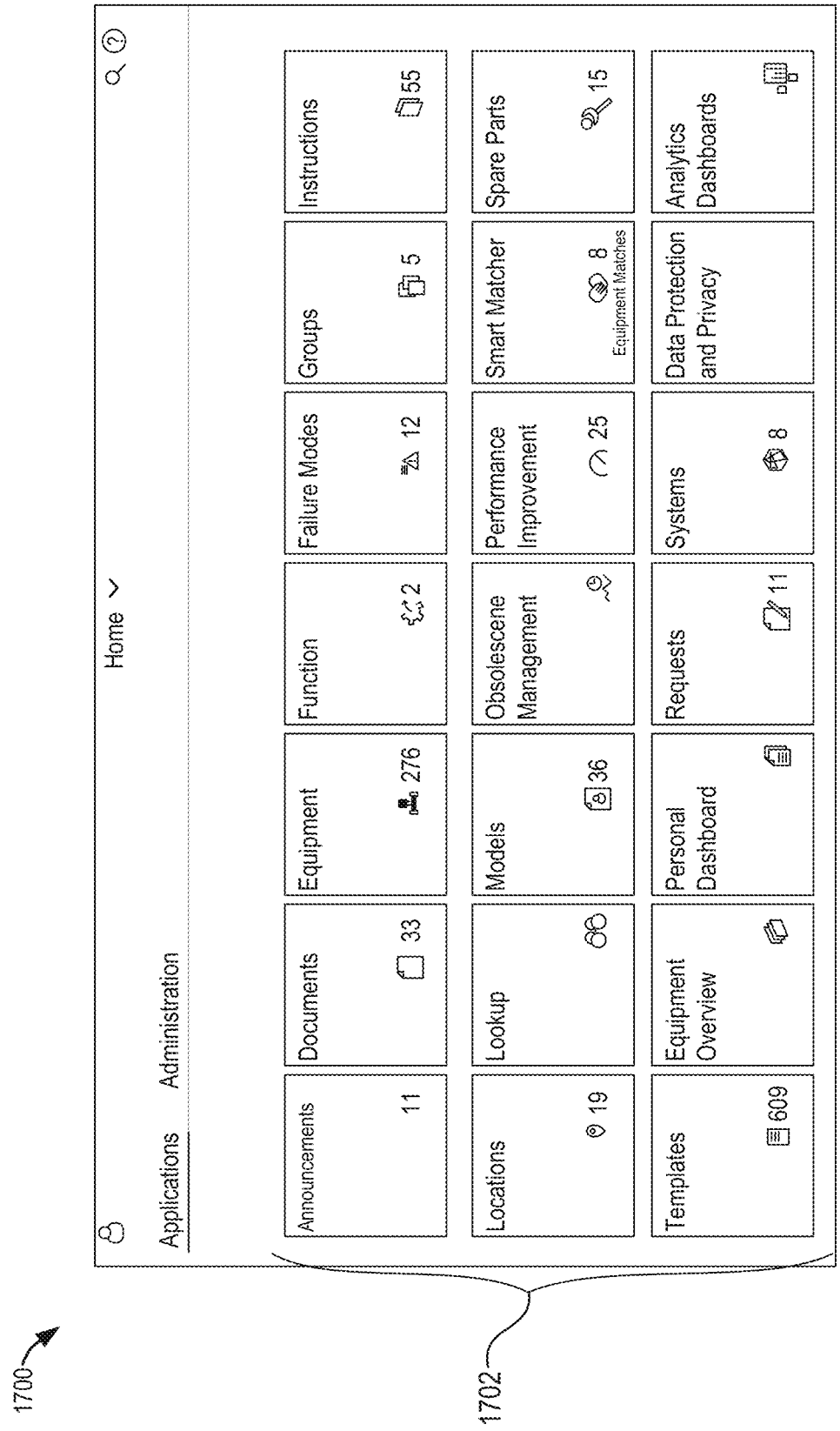

In another example embodiment, the user interface is in the form of one or more tiles. For example, the representations corresponding to the custom microservice and each of the core microservices are each displayed as a tile comprising a simple overview or event associated with the microservice represented by the tile, as shown in the example UI 1700 of FIG. 17. The UI 1700 comprises multiple tiles 1702, each tile corresponding to a custom or core microservice. In one example, each tile comprises an overview of a particular event, such as a number of announcements, a number of documents, a number of failures, and so forth.

In one example, the custom microservice template, described above, can include a template component for displaying the custom microservice in a tile comprising a particular event corresponding to the custom microservice, or an overview of the custom microservice. The tile is then rendered according to the UI components specified in the template component for displaying the custom microservice in a visual card.

In another example embodiment, the user interface is in the form of a monitoring environment. For example, the user interface can display alerts, an updated display, or the like, corresponding to what is being monitored by the custom microservice. For instance, the custom microservice can continually pull data, get reactive feeds, and continuously refresh aspects of the user interface based on the new data. For example, a consumer may be a carpet manufacturer that needs to continuously monitor the status of miles of printed carpets. A user may be sitting in a control room watching the display for alerts on quality, color, design, and so forth. As explained above with respect to other forms of user interfaces, the custom microservice template can also include a template component for displaying a custom microservice in the form of a monitoring environment.

As described above, in one example embodiment the custom microservice is accessible only by the tenant registering the custom microservice. In another example embodiment, the tenant registering the custom microservice can also make it available in a specified network of other tenants. For example, the tenant may be part of an asset intelligence network comprising other tenants in a similar field or related to a certain manufacturer, or the like. In one example, the tenant may be a car manufacturer and include other tenants in the assets intelligence network that are service providers for the car manufactures, sales offices of the car manufacturer, and so forth. The car manufacturer can create and deploy a custom microservice to be accessible by other tenants in the network. The custom microservice can either automatically appear in the service catalog for the other tenants or it can be discovered and subscribed to by the other tenants. In yet another example, the tenant registering the custom microservice can make the custom microservice available to another specified tenant, or generally discoverable to be subscribed to by any other tenants in the system. In this way a tenant can create custom microservices and share them within their network free of cost, or create a business model by selling the custom microservices.

For example, the computing system receives a request from a computing device associated with the tenant to register the custom microservice for access by at least a second tenant with authorization to access the custom microservice and core microservices of the service catalog, and the computing device registers the custom microservice with a service catalog by inserting the registration information into the service catalog to be exposed to and accessed by the second tenant with authorization to access the custom microservice and core microservices of the service catalog. After that, the second tenant can automatically access the custom microservice or subscribe to the custom microservice. For example, the computing system receives a request to access the service catalog from a computing device associated with the second tenant, determines that the second tenant has authorization to access the custom microservice and the core microservices of the service catalog, and provides, to the computing device associated with the second tenant, access to the custom microservice and core microservices of the service catalog.

In one example embodiment, a pipeline or workbench can be created using one or more custom microservices and/or one or more core microservices. A pipeline uses a set of microservices to generate a final output. For example, a tenant can create a pipeline by specifying a number of microservices where a first microservice is mapped to a second microservice, the second microservice is mapped to a third microservice, and so on. The output of the first microservice is an input to the second microservice, the output of the second microservice is an input to the third microservice, and so forth, until a final output is generated. For instance, a first microservice may be a core microservice that outputs a map of a specified location, a second microservice may be a core microservice that outputs work orders for machines in the specified location, and a third microservice may be a custom microservice that outputs the unfinished work orders for machines in the specified location. The pipeline can be scheduled to run at a specified time, regular time intervals, and so forth.

For example, the computing system receives a request to generate a pipeline comprising the custom microservice and at least one core microservice, generates the pipeline, and causes display of results of the pipeline upon request to access the results of the pipeline.

Figure 18:
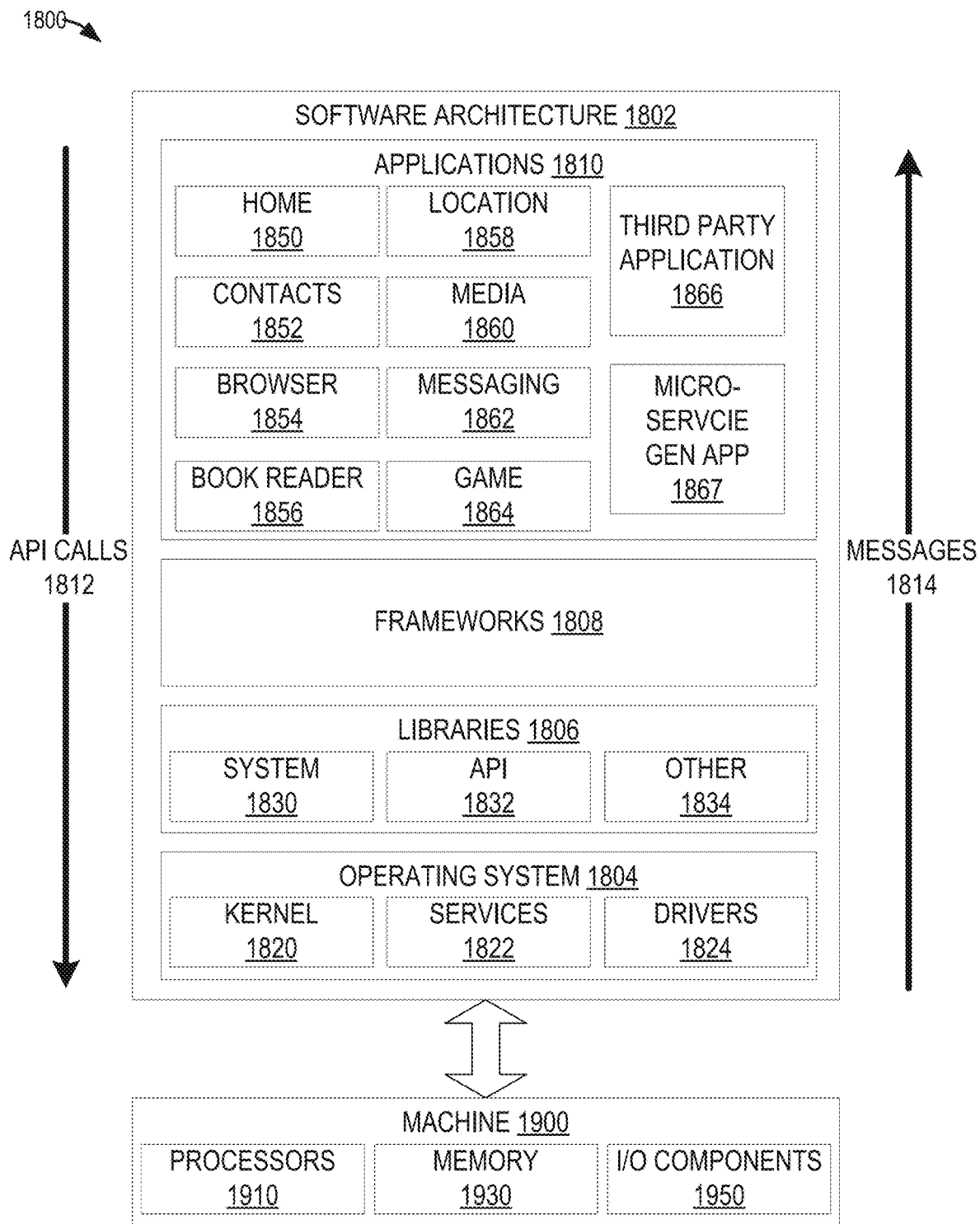
FIG. 18 is a block diagram illustrating an example of a software architecture that may be installed on a machine, according to some example embodiments.

FIG. 18 is a block diagram 1800 illustrating software architecture 1802, which can be installed on any one or more of the devices described above. For example, in various embodiments, client devices 110 and servers and systems 130, 102, 120, 122, and 124 may be implemented using some or all of the elements of software architecture 1802. FIG. 18 is merely a non-limiting example of a software architecture, and it will be appreciated that many other architectures can be implemented to facilitate the functionality described herein. In various embodiments, the software architecture 1802 is implemented by hardware such as machine 1900 of FIG. 19 that includes processors 1910, memory 1930, and I/O components 1950. In this example, the software architecture 1802 can be conceptualized as a stack of layers where each layer may provide a particular functionality. For example, the software architecture 1802 includes layers such as an operating system 1804, libraries 1806, frameworks 1808, and applications 1810. Operationally, the applications 1810 invoke application programming interface (API) calls 1812 through the software stack and receive messages 1814 in response to the API calls 1812, consistent with some embodiments.

In various implementations, the operating system 1804 manages hardware resources and provides common services. The operating system 1804 includes, for example, a kernel 1820, services 1822, and drivers 1824. The kernel 1820 acts as an abstraction layer between the hardware and the other software layers, consistent with some embodiments. For example, the kernel 1820 provides memory management, processor management (e.g., scheduling), component management, networking, and security settings, among other functionality. The services 1822 can provide other common services for the other software layers. The drivers 1824 are responsible for controlling or interfacing with the underlying hardware, according to some embodiments. For instance, the drivers 1824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1806 provide a low-level common infrastructure utilized by the applications 1810. The libraries 1806 can include system libraries 1830 (e.g., C standard library) that can provide functions such as memory allocation functions, string manipulation functions, mathematic functions, and the like. In addition, the libraries 1806 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1806 can also include a wide variety of other libraries 1834 to provide many other APIs to the applications 1810.

The frameworks 1808 provide a high-level common infrastructure that can be utilized by the applications 1810, according to some embodiments. For example, the frameworks 1808 provide various graphic user interface (GUI) functions, high-level resource management, high-level location services, and so forth. The frameworks 1808 can provide a broad spectrum of other APIs that can be utilized by the applications 1810, some of which may be specific to a particular operating system 1804 or platform.

In an example embodiment, the applications 1810 include a home application 1850, a contacts application 1852, a browser application 1854, a book reader application 1856, a location application 1858, a media application 1860, a messaging application 1862, a game application 1864, and a broad assortment of other applications such as a third-party application 1866. According to some embodiments, the applications 1810 are programs that execute functions defined in the programs. Various programming languages can be employed to create one or more of the applications 1810, structured in a variety of manners, such as object-oriented programming languages (e.g., Objective-C, Java, or C++) or procedural programming languages (e.g., C or assembly language). In a specific example, the third-party application 1866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1866 can invoke the API calls 1812 provided by the operating system 1804 to facilitate functionality described herein.

Some embodiments may particularly include microservice generation application 1867. In certain embodiments, this may be a stand-alone application that operates to manage communications with a server system such as third-party servers 130 or server system 102. In other embodiments, this functionality may be integrated with another application. The microservice generation application 1867 may request and display various data related to generating custom microservices and may provide the capability for a user 106 to input data related to the objects via a touch interface, keyboard, or using a camera device of machine 1900, communication with a server system via I/O components 1950, and receipt and storage of object data in memory 1930. Presentation of information and user inputs associated with the information may be managed by microservice generation application 1867 using different frameworks 1808, library 1806 elements, or operating system 1804 elements operating on a machine 1900.

Figure 19:
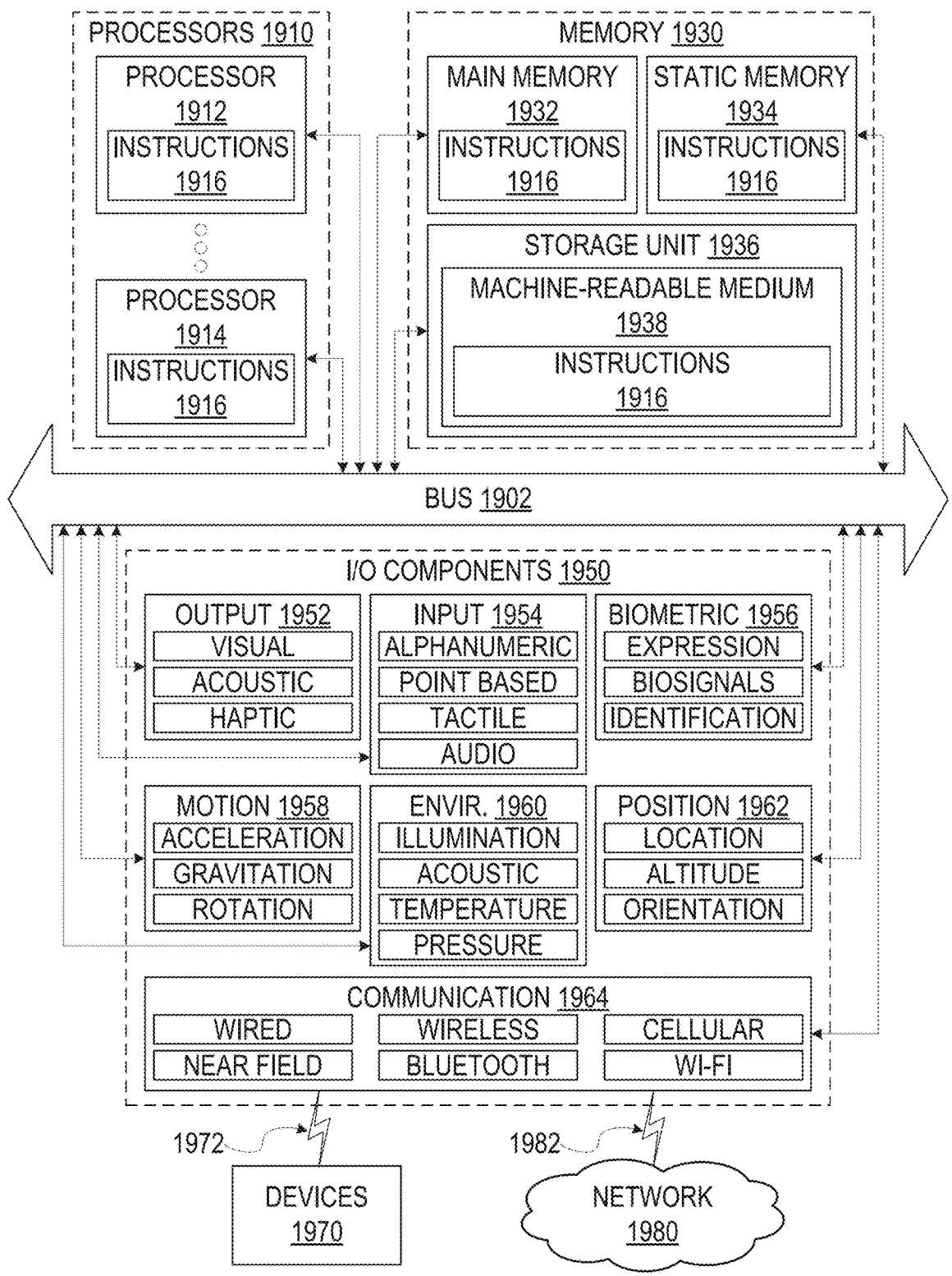
FIG. 19 illustrates a diagrammatic representation of a machine, in the form of a computer system, within which a set of instructions may be executed for causing the machine to perform any one or more of the methodologies discussed herein, according to an example embodiment.

FIG. 19 is a block diagram illustrating components of a machine 1900, according to some embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application 1810, an applet, an app, or other executable code) for causing the machine 1900 to perform any one or more of the methodologies discussed herein can be executed. In alternative embodiments, the machine 1900 operates as a standalone device or can be coupled (e.g., networked) to other machines. In a networked deployment, the machine 1900 may operate in the capacity of a server machine 130, 102, 120, 122, 124, etc., or a client device 110 in a server-client network environment, or as a peer machine in a peer-to-peer (or distributed) network environment. The machine 1900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

In various embodiments, the machine 1900 comprises processors 1910, memory 1930, and I/O components 1950, which can be configured to communicate with each other via a bus 1902. In an example embodiment, the processors 1910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1912 and a processor 1914 that may execute the instructions 1916. The term "processor" is intended to include multi-core processors 1910 that may comprise two or more independent processors 1912, 1914 (also referred to as "cores") that can execute instructions 1916 contemporaneously. Although FIG. 19 shows multiple processors 1910, the machine 1900 may include a single processor 1910 with a single core, a single processor 1910 with multiple cores (e.g., a multi-core processor 1910), multiple processors 1912, 1914 with a single core, multiple processors 1912, 1914 with multiples cores, or any combination thereof.

The memory 1930 comprises a main memory 1932, a static memory 1934, and a storage unit 1936 accessible to the processors 1910 via the bus 1902, according to some embodiments. The storage unit 1936 can include a machine-readable medium 1938 on which are stored the instructions 1916 embodying any one or more of the methodologies or functions described herein. The instructions 1916 can also reside, completely or at least partially, within the main memory 1932, within the static memory 1934, within at least one of the processors 1910 (e.g., within the processor's cache memory), or any suitable combination thereof, during execution thereof by the machine 1900. Accordingly, in various embodiments, the main memory 1932, the static memory 1934, and the processors 1910 are considered machine-readable media 1938.

As used herein, the term "memory" refers to a machine-readable medium 1938 able to store data temporarily or permanently and may be taken to include, but not be limited to, random-access memory (RAM), read-only memory (ROM), buffer memory, flash memory, and cache memory. While the machine-readable medium 1938 is shown, in an example embodiment, to be a single medium, the term "machine-readable medium" should be taken to include a single medium or multiple media (e.g., a centralized or distributed database, or associated caches and servers) able to store the instructions 1916. The term "machine-readable medium" shall also be taken to include any medium, or combination of multiple media, that is capable of storing instructions (e.g., instructions 1916) for execution by a machine (e.g., machine 1900), such that the instructions 1916, when executed by one or more processors of the machine 1900 (e.g., processors 1910), cause the machine 1900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1950 include a wide variety of components to receive input, provide output, produce output, transmit information, exchange information, capture measurements, and so on. In general, it will be appreciated that the I/O components 1950 can include many other components that are not shown in FIG. 19. The I/O components 1950 are grouped according to functionality merely for simplifying the following discussion, and the grouping is in no way limiting. In various example embodiments, the I/O components 1950 include output components 1952 and input components 1954. The output components 1952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1954 include alphanumeric input components (e.g., a keyboard, a touch screen configured to receive alphanumeric input, a photooptical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1950 include biometric components 1956, motion components 1958, environmental components 1960, or position components 1962, among a wide array of other components. For example, the biometric components 1956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1958 include acceleration sensor components (e.g., accelerometer), gravitation sensor components, rotation sensor components (e.g., gyroscope), and so forth. The environmental components 1960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 include a network interface component or another suitable device to interface with the network 1980. In further examples, communication components 1964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1970 may be another machine 1900 or any of a wide variety of peripheral devices (e.g., a peripheral device coupled via a Universal Serial Bus (USB)).

Moreover, in some embodiments, the communication components 1964 detect identifiers or include components operable to detect identifiers. For example, the communication components 1964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1980 or a portion of the network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1916 are transmitted or received over the network 1980 using a transmission medium via a network interface device (e.g., a network interface component included in the communication components 1964) and utilizing any one of a number of well-known transfer protocols (e.g., Hypertext Transfer Protocol (HTTP)). Similarly, in other example embodiments, the instructions 1916 are transmitted or received using a transmission medium via the coupling 1972 (e.g., a peer-to-peer coupling) to the devices 1970. The term "transmission medium" shall be taken to include any intangible medium that is capable of storing, encoding, or carrying the instructions 1916 for execution by the machine 1900, and includes digital or analog communications signals or other intangible media to facilitate communication of such software.

Furthermore, the machine-readable medium 1938 is non-transitory (in other words, not having any transitory signals) in that it does not embody a propagating signal. However, labeling the machine-readable medium 1938 "non-transitory" should not be construed to mean that the medium is incapable of movement; the medium 1938 should be considered as being transportable from one physical location to another. Additionally, since the machine-readable medium 1938 is tangible, the medium 1938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    causing display, at a computing device, of a template selection user interface comprising a plurality of templates for selection to develop a custom microservice;
    receiving, from the computing device, a selection of a template for a custom microservice from the plurality of templates for selection to develop a custom microservice;
    causing display, at the computing device, of a user interface for entering configuration parameters for the custom microservice;
    receiving, from the computing device, the entered configuration parameters for the custom microservice;
    retrieving the template for the custom microservice, the custom template comprising stubs for custom components for the custom microservice;
    populating associated parameters in the retrieved template for the custom microservice with the entered configuration parameters;
    providing the populated template for the custom microservice to the computing device, wherein custom components for the custom microservice are added to the template via the computing device using the stubs in the populated template for the custom components; and
    registering the custom software microservice to be exposed to and accessed by a tenant with authorization to access the custom microservice along with core software microservices.

2. The method of claim 1, wherein the configuration parameters comprise at least one of a name for the custom microservice, a namespace for the custom microservice, an image for the custom microservice, or a description for the custom microservice.

3. The method of claim 1, wherein the template for the custom microservice comprises stubs for custom components and the custom components are added to the template via the computing device using the stubs for custom components.

4. The method of claim 1, wherein the template for custom microservices comprises an authorization and authentication instance for defining authorization and authentication for the custom microservice.

5. The method of claim 1, wherein the template for the custom microservice comprises a connectivity instance storing connectivity data defining how to connect to external systems for data or software microservices used by the custom microservice.

6. The method of claim 1, wherein registering the custom microservice comprises storing user interface components corresponding to the custom microservice.

7. The method of claim 1, further comprising:
    causing the custom microservice to be displayed along with the core software microservices in a user interface of a second computing device requesting access to the custom microservice and core software microservices.

8. The method of claim 1, further comprising:
    causing display on the computing device of a user interface comprising the custom microservice and the core software microservices in a selection list.

9. The method of claim 8, wherein each of the custom microservice and the core software microservices is displayed as a tab in the selection list.

10. The method of claim 8, wherein each of the custom microservice and the core software microservice is displayed as a visual card comprising at least one event associated with each of the custom microservice and core software microservices.

11. A system comprising:
    a memory that stores instructions; and
    one or more processors configured by the instructions to perform operations comprising:
    causing display, at a computing device, of a template selection user interface comprising a plurality of templates for selection to develop a custom microservice;
    receiving, from the computing device, a selection of a template for a custom microservice from the plurality of templates for selection to develop a custom microservice;

causing display, at the computing device, of a user interface for entering configuration parameters for the custom microservice;

receiving, from the computing device, the entered configuration parameters for the custom microservice;

retrieving the template for the custom microservice, the custom template comprising stubs for custom components for the custom microservice;

populating associated parameters in the retrieved template for the custom microservice with the entered configuration parameters;

providing the populated template for the custom microservice to the computing device, wherein custom components for the custom microservice are added to the template via the computing device using the stubs in the populated template for the custom components; and registering the custom microservice to be exposed to and accessed by a tenant with authorization to access the custom microservice along with core software microservices.

12. The system of claim 11, wherein the configuration parameters comprise at least one of a name for the custom microservice, a namespace for the custom microservice, an image for the custom microservice, or a description for the custom microservice.

13. The system of claim 11, wherein the template for the custom microservice comprises stubs for custom components and the custom components are added to the template via the computing device using the stubs for custom components.

14. The system of claim 11, wherein the template for custom microservices comprises an authorization and authentication instance for defining authorization and authentication for the custom microservice.

15. The system of claim 11, wherein the template for the custom microservice comprises a connectivity instance storing connectivity data defining how to connect to external systems for data or software microservices used by the custom microservice.

16. The system of claim 11, wherein registering the custom microservice comprises storing user interface components corresponding to the custom microservice.

17. The system of claim 11, further comprising:
causing the custom microservice to be displayed along with the core software microservices in a user interface of a second computing device requesting access to the custom microservice and core software microservices.

18. The system of claim 11, further comprising:
causing display on the computing device of a user interface comprising the custom microservice and the core software microservices in a selection list, wherein each of the custom microservice and the core software microservices is displayed as a tab in the selection list.

19. The system of claim 11, further comprising:
causing display on the computing device of a user interface comprising the custom microservice and the core software microservices in a selection list, wherein each of the custom microservice and the core software microservice is displayed as a visual card comprising at least one event associated with each of the custom microservice and core software microservices.

20. A non-transitory computer-readable medium comprising instructions stored thereon that are executable by at least one processor to cause a computing system to perform operations comprising:

causing display, at a computing device, of a template selection user interface comprising a plurality of templates for selection to develop a custom microservice;

receiving, from the computing device, a selection of a template for a custom microservice from the plurality of templates for selection to develop a custom microservice;

causing display, at the computing device, of a user interface for entering configuration parameters for the custom microservice;

receiving, from the computing device, the entered configuration parameters for the custom microservice;

retrieving the template for the custom microservice, the custom template comprising stubs for custom components for the custom microservice;

populating associated parameters in the retrieved template for the custom microservice with the entered configuration parameters;

providing the populated template for the custom microservice to the computing device, wherein custom components for the custom microservice are added to the template via the computing device using the stubs in the populated template for the custom components; and registering the custom microservice to be exposed to and accessed by a tenant with authorization to access the custom microservice along with core software microservices.

* * * * *